(12) United States Patent
Matthews et al.

(10) Patent No.: US 11,695,993 B1
(45) Date of Patent: Jul. 4, 2023

(54) SYSTEM AND METHOD FOR CREATING AND ORGANIZING CONTENT

(71) Applicant: America's Collectibles Network, Inc., Knoxville, TN (US)

(72) Inventors: Timothy B. Matthews, Knoxville, TN (US); Chris Meystrik, Knoxville, TN (US); Samuel Reynolds, Knoxville, TN (US); Matthew Honeycutt, Knoxville, TN (US); Vivek Mongolu, Knoxville, TN (US); Gabriel Cooper, Knoxville, TN (US); Mickey West, Knoxville, TN (US); Benjamin Walsh, Knoxville, TN (US)

(73) Assignee: America's Collectibles Network, Inc., Knoxville, TN (US)

( * ) Notice: Subject to any disclaimer, the term of this patent is extended or adjusted under 35 U.S.C. 154(b) by 0 days.

(21) Appl. No.: 17/063,528

(22) Filed: Oct. 5, 2020

(51) Int. Cl.
*H04N 21/472* (2011.01)
*H04N 21/81* (2011.01)
*H04N 21/482* (2011.01)
*H04N 21/854* (2011.01)
*H04N 21/262* (2011.01)
*H04N 21/431* (2011.01)
*H04N 1/00* (2006.01)
*G06F 3/0482* (2013.01)
(Continued)

(52) U.S. Cl.
CPC ......... *H04N 21/472* (2013.01); *G06F 3/0482* (2013.01); *H04N 1/00413* (2013.01); *H04N 21/26258* (2013.01); *H04N 21/26283* (2013.01); *H04N 21/278* (2013.01); *H04N 21/431* (2013.01); *H04N 21/4828* (2013.01); *H04N 21/8133* (2013.01); *H04N 21/84* (2013.01); *H04N 21/854* (2013.01)

(58) Field of Classification Search
None
See application file for complete search history.

(56) References Cited

U.S. PATENT DOCUMENTS 5,594,509 A * 1/1997 Florin .............. H04N 21/47214
725/43
5,619,249 A * 4/1997 Billock ............ H04N 21/47202
725/5
(Continued)

FOREIGN PATENT DOCUMENTS

WO WO-2014130594 A1 * 8/2014 ............. G06Q 30/08

*Primary Examiner* — An Son P Huynh
(74) *Attorney, Agent, or Firm* — Nelson Mullins Riley & Scarborough LLP; Anthony A. Laurentano

(57) ABSTRACT

The present invention is directed to a content creation system comprising one or more client devices, one or more servers including a database for storing information related to a plurality of items to be displayed and sold during a show, identification information associated with the plurality of items, a quantity of the plurality of items in stock in a warehouse, a plurality of audio segments, and a plurality of video segments, and a program creation unit for processing the information received from the database and for creating the show for subsequent broadcast, the show having a plurality of plays. The system also includes a network coupled to the one or more client devices and the one or more servers for allowing the one or more client devices to communicate with the one or more servers.

42 Claims, 25 Drawing Sheets

(51) Int. Cl.
*H04N 21/278* (2011.01)
*H04N 21/84* (2011.01)

(56) References Cited

U.S. PATENT DOCUMENTS

| | | | | |
|---|---|---|---|---|
| 6,564,378 B1* | 5/2003 | Satterfield | H04N 21/482 | 725/40 |
| 6,832,386 B1* | 12/2004 | Jerding | H04N 7/17318 | 725/39 |
| 7,024,676 B1* | 4/2006 | Klopfenstein | H04N 21/434 | 725/49 |
| 7,165,098 B1* | 1/2007 | Boyer | H04N 21/4782 | 709/219 |
| 7,373,652 B1* | 5/2008 | Bayrakeri | H04N 21/4383 | 725/53 |
| 7,761,892 B2* | 7/2010 | Ellis | H04N 21/26283 | 725/44 |
| 8,046,801 B2* | 10/2011 | Ellis | H04N 21/47815 | 725/58 |
| 9,449,216 B1* | 9/2016 | Dhua | G06V 40/167 | |
| 9,973,819 B1* | 5/2018 | Taylor | H04N 7/17318 | |
| 10,021,458 B1* | 7/2018 | Taylor | H04N 21/2187 | |
| 10,194,189 B1* | 1/2019 | Goetz | H04N 21/43079 | |
| 10,198,762 B1* | 2/2019 | Dangaltchev | G06Q 30/02 | |
| 10,419,790 B2* | 9/2019 | Gersten | H04N 21/454 | |
| 10,440,436 B1* | 10/2019 | Taylor | H04N 21/234345 | |
| 10,970,763 B1* | 4/2021 | Allen | G06F 3/0482 | |
| 11,501,802 B2* | 11/2022 | Bloch | G11B 27/034 | |
| 2002/0174430 A1* | 11/2002 | Ellis | H04N 21/812 | 725/46 |
| 2004/0034867 A1* | 2/2004 | Rashkovskiy | G06F 3/04842 | 725/40 |
| 2004/0117831 A1* | 6/2004 | Ellis | H04N 21/485 | 725/53 |
| 2005/0010955 A1* | 1/2005 | Elia | G06F 3/0482 | 725/88 |
| 2005/0251827 A1* | 11/2005 | Ellis | H04N 7/163 | 725/47 |
| 2005/0278741 A1* | 12/2005 | Robarts | H04N 21/47 | 725/46 |
| 2007/0139443 A1* | 6/2007 | Marks | G06F 3/017 | 345/629 |
| 2007/0186180 A1* | 8/2007 | Morgan | H04N 21/478 | 715/779 |
| 2008/0086456 A1* | 4/2008 | Rasanen | H04N 21/84 | 348/E7.071 |
| 2008/0104058 A1* | 5/2008 | Billmaier | H04N 21/4314 | |
| 2008/0158229 A1* | 7/2008 | Gossweiler, III | H04N 5/44543 | 345/440 |
| 2008/0270449 A1* | 10/2008 | Gossweiler | G06F 16/738 | |
| 2010/0031162 A1* | 2/2010 | Wiser | H04N 21/431 | 715/747 |
| 2010/0153885 A1* | 6/2010 | Yates | H04N 21/4532 | 715/841 |
| 2010/0262995 A1* | 10/2010 | Woods | H04N 21/4312 | 725/40 |
| 2011/0010211 A1* | 1/2011 | Cavander | G06Q 30/02 | 705/7.31 |
| 2013/0305147 A1* | 11/2013 | McBride | G06F 40/166 | 715/256 |
| 2013/0332961 A1* | 12/2013 | Ishigaki | H04N 21/237 | 725/44 |
| 2014/0049691 A1* | 2/2014 | Burdzinski | H04N 17/04 | 348/563 |
| 2014/0123072 A1* | 5/2014 | Bhowmick | G06F 3/0482 | 715/838 |
| 2015/0161671 A1* | 6/2015 | Watkeys | H04L 67/20 | 705/14.66 |
| 2016/0006981 A1* | 1/2016 | Bauman | H04N 21/4788 | 348/14.03 |
| 2016/0037217 A1* | 2/2016 | Harmon | H04N 21/4542 | 725/9 |
| 2016/0094875 A1* | 3/2016 | Peterson | H04N 21/4312 | 725/41 |
| 2016/0381427 A1* | 12/2016 | Taylor | H04N 21/23424 | 725/13 |
| 2017/0140319 A1* | 5/2017 | Gottemukkala | G06F 3/04847 | |
| 2018/0192130 A1* | 7/2018 | Liston | H04N 21/4826 | |
| 2018/0310066 A1* | 10/2018 | Kobayashi | H04N 21/47815 | |
| 2019/0387267 A1* | 12/2019 | Shusman | H04N 21/4758 | |
| 2020/0342504 A1* | 10/2020 | Yadav | G06Q 30/0283 | |
| 2021/0182309 A1* | 6/2021 | Qiu | G06F 16/9535 | |

* cited by examiner

▼ShowManager
ShowManager schedule  my shows  inventory  design  analysis  live

Load Show: [    ] Go

Filtering for Future Shows Only. People of Ben Walsh

| Batch | Description | Host(s) | Start Time | ▲ End Time | Status | Actions |
|---|---|---|---|---|---|---|
| C5SED | Diamonds in Silver with Wendy | Dawn Page-test | 05/12/2019 02:00 PM | 05/12/2019 04:00 PM | Merchandising | I D A R |
| QI3HV | Bella Luce with Bishva | Bishva Shah | 06/01/2019 08:00 PM | 06/01/2019 10:00 PM | Merchandising | I D A |

1 - 2 of 2 results

schedule my shows inventory design analysis live

Load Show: C5SED | C5SED | Go |
Generic Color Silver | 0/120 |
Other | 8 |
Total | 8/120 |

ShowManager
Diamonds in Silver with Wendy Merchandising
Batch Code: C5SED Show id: 183540
Dawn Page-Tesh 05/12/19 2:00 PM-4:00 PM
Categories  Print Checked...  Print Summary...  *Show Forecast*

Product Type

| Check All | SKU Count | Ext Price | % of SKUs |
|---|---|---|---|
| BRACELET | 5 | $JH,KJH,KJ | 10.20% |
| CHAIN | 1 | $H,KJ | 2.04% |
| CUFFLINKS | 1 | $H,KJ | 2.04% |
| EARRINGS | 3 | $JH,KJH,KJ | 6.12% |
| GEMSTONE PARCEL | 1 | $JH,KJH,KJ | 2.04% |
| MINERAL SPECIMEN | 1 | $JH,KJH,KJ | 2.04% |
| NECKLACE | 5 | $H,KJH,KJ | 10.20% |
| PENDANT | 4 | $JH,KJH,KJ | 8.16% |
| RING | 18 | $JHL,KJH,KJ | 36.73% |
| SINGLE GEMSTONE | 8 | $JHL,KJH,KJ | 16.33% |
| WRIST WATCH | 2 | $JH,KJH,KJ | 4.08% |
| Total | 49 | $D,JHG,KJH,KJ | 100.00% |

Plays

| Check All | SKU Count | Ext Price | % of SKUs |
|---|---|---|---|
| Intro | 4 | $JHG,KJH,KJ | 8.16% |
| None | 39 | $JHG,KJH,KJ | 79.59% |
| Unnamed Key Item Play | 6 | $HG,KJH,KJ | 12.24% |
| Total | 49 | $D,JHG,KJH,KJ | 100.00% |

Showing Labels

| Check All | SKU | Ext Price | % of SKUs |
|---|---|---|---|
| None | 49 | $D,JHG,KJH,KJ | 100.00% |
| Total | 49 | $D,JHG,KJH,KJ | 100.00% |

Gemstone
Check All  SKU

FIG. 15

SYSTEM AND METHOD FOR CREATING AND ORGANIZING CONTENT

BACKGROUND OF THE INVENTION

It is well known in the art that media content that is broadcasted and displayed through selected channels, such as television stations, on-line channels, and the like, must be created and organized prior to broadcasting. Typically, the shows or programs that are broadcasted require multiple skilled people and large amounts of time to create and organize. The program can typically be divided into segments, where each segment has a theme and associated content. The segments can be linked together in a logical and cohesive manner so as to form the overall or entire program.

Conventional systems exist that aid in the creation of the programs. However, the conventional systems are not well organized, lack robust features that allow the skilled people to create the programs, and are limited in terms of the number of options available to the skilled people creating the content.

SUMMARY OF THE INVENTION

The present application is related to a content creation system and associated method for allowing skilled people or users to create and organize a program that can be broadcast to viewers. The program can be of any selected type and can be for any selected period of time. The user of the system can create and organize the show using a series of relatively easy to use and understand user interfaces.

The present invention is directed to a content creation system comprising one or more client devices, one or more servers including a database for storing information related to a plurality of items to be displayed and sold during a show, identification information associated with the plurality of items, a quantity of the plurality of items in stock in a warehouse, a plurality of audio segments, and a plurality of video segments, and a program creation unit for processing the information received from the database and for creating the show for subsequent broadcast, the show having a plurality of plays. The system also includes a network coupled to the one or more client devices and the one or more servers for allowing the one or more client devices to communicate with the one or more servers.

The program creation unit comprises a content generation unit having a processor programmed to: generate an interface having a window element with a plurality of tab elements formed along a top portion of the window element, wherein the plurality of tab elements includes at least a Schedule tab element for displaying when actuated a schedule of the show created by the program creation unit and associated broadcast dates and times thereof; a My Shows tab element for displaying a list of shows associated with a selected user in the window element; an Inventory tab element for displaying inventory data of the plurality of items in the window element; a Design tab element for displaying one or more user interfaces that allow the user to create and organize the show; an Analysis tab element for displaying data associated with the analysis of the constructed show; and a Live tab element for displaying in a user interface information associated with a live broadcast of the show.

According to one aspect, when the My Shows tab element of the plurality of tab elements is actuated by a user the content creation unit generates an interface having the window element, wherein the window element further comprises a centrally located pane element that extends from the left side of the window to the right side of the window and is disposed adjacent to the plurality of tab elements, and wherein the centrally located pane element includes in a tabular format a description of the shows, a host associated with each of the shows, a start time and an end time of the show, a program status of the show, and one or more action icons associated with the show. The action icons displayed in the window element include a plurality of soft button elements, wherein one or more of the soft button elements are representative of one or more of the tab elements.

According to another aspect, when the My Shows tab element is actuated, the central pane element includes a search field pane element that includes a plurality of search field elements. The plurality of search field elements enable the user to search for shows using a plurality of search metrics including the user name, a description of the show, a type of show, and a status of the show.

According to the present invention, when the Inventory tab element of the plurality of tab elements is actuated by a user the content creation unit generates an interface having the window element, wherein the window element further comprises an inventory pane element that extends from the left side of the window to the right side of the window and is disposed immediately adjacent to the portion of the window that displays the tab elements, wherein the pane element displays information associated with the plurality of items in inventory. The inventory pane element includes a plurality of item specific fields that enable the user to search for and select one or more of the plurality of items in the inventory according to one or more predetermined attributes. Further, the one or more predetermined attributes includes an item type, a brand name of the item, a color of the item, a material type of the item, a price of the item. The inventory pane element further includes along a right side portion thereof a plurality of stacked field elements associated with the formation of the show. The stacked field elements includes a first field element associated with the items selected for the show, a stacked second field element indicating a status of the show and items associated therewith, and a third stacked field element displaying a planning history of the show.

According to another aspect, when the Design tab element of the plurality of tab elements is actuated by a user the content creation unit generates an interface having the window element, wherein the window element includes a top pane element disposed below and adjacent to the portion of the window that displays the tab elements, a left pane element, and a right pane element, wherein the left pane element and the right pane element are below the top pane element and extend from left to right across the window. The top pane element displays a plurality of financial metrics associated with the plurality of items in the show. Also, the plurality of financial metrics include a gross revenue of the show and a gross margin of the show, wherein the financial metrics include a gross revenue of each segment of the show and a gross margin of each segment of the show. Further, the left pane element displays data associated with an outline of the show, wherein the outline has one or more plays associated therewith, and wherein the data includes the number of plays forming the show and the type of plays that form the show. As described herein, each play of the show further comprises one or more of the plurality of items selected from the Inventory tab element, and the right pane element displays one or more contingency plays of the show. The user can move one or more of the contingency plays in the right pane element to the left pane element.

According to still another aspect, when the window element is actuated, the content generation unit generates the window element having a right pane element and first and second left pane elements, wherein the first and second left panes are stacked, and wherein the right pane element and the first left pane element are disposed below and immediately adjacent to the portion of the window that displays the tab elements. The right pane element comprises a Show Components pane element for displaying one or more of the plurality of items that are selected from inventory by actuating the Inventory tab element. Further, the first left pane element includes a Play Components pane element for displaying one or more items in one or more of the segments of the show, and the second left pane element includes a Contingency Component pane element for displaying one or more contingency items for replacing one or more of the items in the show or the segment. The items displayed in the Show Component pane element are movable by the user to the Play Components pane element and to the Contingent Components pane element. Still further, one or more of the items displayed in the Play Components pane element includes a Key Item designation.

The Show Components pane element can also include a filter field for allowing the user to search selected items in the inventory according to one or more selected attributes. The content generation unit can also generate in a bottom portion of the frame a Play Comments button element for displaying when actuated a Play Comments field. The Play Comment field allows a user to input selected comments on the play that is being created through a text input field.

The right pane element can also optionally include a plurality of tab elements. The tab elements comprise a Products tab element for displaying one or more preselected items and a Programming Elements tab element for allowing the user to select one or more programming components of the segment of the show.

According to yet another aspect, when actuated the Programming Elements tab element invokes a Category field and a Name field to be displayed in the right pane element, wherein the Category field has a drop down menu that includes a number of selectable menu items that form a library that can be selected by the user.

Further, when the Analysis tab element is actuated, the content generation unit generates an interface displaying a plurality of metrics associated with the segment and the items forming part of the segment. The metrics include the Product Types in each segment, the number of items of each type, and the segments created for the show.

Still further, the content creation unit can generate a print icon element that is actuatable by a user. When the print icon element is actuated, the content generation unit generates and displays a run sheet of the segment of the program, where the run sheet is a collection of information in a sheet format that allows the user to plan and execute the program.

When the Inventory tab element of the plurality of tab elements is actuated by a user the content creation unit generates an interface having the window element, where the window element further includes an inventory pane element that extends from the left side of the window to the right side of the window and is disposed immediately adjacent to the portion of the window that displays the tab elements. The pane element displays information associated with the plurality of items in inventory, and the inventory pane element includes a plurality of item specific fields that enable the user to search for and select one or more of the plurality of items in the inventory according to one or more predetermined attributes. The inventory pane element further includes along a right hand side portion thereof a plurality of stacked field elements associated with the formation of the show.

When the Design tab element of the plurality of tab elements is actuated by a user the content creation unit generates an interface having the window element, where the window element includes a top pane element disposed below and adjacent to the portion of the window that displays the tab elements, a left pane element, and a right pane element. The left pane element and the right pane element are disposed immediately below and adjacent to the top pane element and extends from left to right across the window. The top pane element displays a plurality of financial metrics associated with the plurality of items in the show, and the left pane element displays data associated with an outline of the show. The outline has one or more plays associated therewith, and the data includes the number of plays forming the show and the type of plays that form the show. The right pane element displays one or more contingency plays of the show.

Further, when the window element is actuated, the content generation unit generates the window element having a right pane element and first and second left pane elements, wherein the first and second left panes are stacked, and wherein the right pane element and the first left pane element are disposed below and immediately adjacent to the portion of the window that displays the tab elements. The right pane element comprises a Show Components pane element for displaying one or more of the plurality of items that are selected from inventory by actuating the Inventory tab element; wherein the first left pane element includes a Play Components pane element for displaying one or more items in one or more of the segments of the show; and wherein the second left pane element includes a Contingency Component pane element for displaying one or more contingency items for replacing one or more of the items in the show or the segment.

When the Analysis tab element is actuated, the content generation unit generates the window element having a plurality of metrics associated with the segment and the items forming part of the segment, wherein the metrics include the Product Types in each segment, the number of items of each type, and the segments created for the program.

The present invention is also directed to a computer implemented method comprising providing one or more client devices; providing one or more servers including a database for storing information related to a plurality of items to be displayed and sold during a show, identification information associated with the plurality of items, a quantity of the plurality of items in stock in a warehouse, a plurality of audio segments, and a plurality of video segments, processing the information received from the database with a program creation unit for creating the show for subsequent broadcast, the show having a plurality of plays; and providing a network coupled to the one or more client devices and the one or more servers for allowing the one or more client devices to communicate with the one or more servers.

According to the method of the present invention, when the Inventory tab element of the plurality of tab elements is actuated, generating an interface having the window element. The window element further includes an inventory pane element that extends from the left side of the window to the right side of the window and is disposed immediately adjacent to the portion of the window that displays the tab elements. The pane element displays information associated with the plurality of items in inventory, wherein the inventory pane element includes a plurality of item specific fields that enable the user to search for and select one or more of the plurality of items in the inventory according to one or more predetermined attributes. The inventory pane element further includes along a right hand side portion thereof a plurality of stacked field elements associated with the formation of the show.

According to another aspect of the method of the present invention, when the Design tab element of the plurality of tab elements is actuated, generating an interface having the window element, wherein the window element includes a top pane element disposed below and adjacent to the portion of the window that displays the tab elements, a left pane element, and a right pane element, wherein the left pane element and the right pane element are below the top pane element and extend from left to right across the window. The top pane element displays a plurality of financial metrics associated with the plurality of items in the show, and the left pane element displays data associated with an outline of the show. The outline has one or more plays associated therewith, and wherein the data includes the number of plays forming the show and the type of plays that form the show, and wherein the right pane element displays one or more contingency plays of the show.

According to still another aspect of the method of the present invention, when the window element is actuated, generating the window element having a right pane element and first and second left pane elements, wherein the first and second left panes are stacked, and wherein the right pane element and the first left pane element are disposed below and immediately adjacent to the portion of the window that displays the tab elements. The right pane element comprises a Show Components pane element for displaying one or more of the plurality of items that are selected from inventory by actuating the Inventory tab element. The first left pane element includes a Play Components pane element for displaying one or more items in one or more of the segments of the show, and the second left pane element includes a Contingency Component pane element for displaying one or more contingency items for replacing one or more of the items in the show or the segment.

According to yet another aspect of the method of the present invention, when the Analysis tab element is actuated, generating the window element having a plurality of metrics associated with the segment and the items forming part of the segment, wherein the metrics include the Product Types in each segment, the number of items of each type, and the segments created for the program.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIG. 2 is a representation of a user interface generated by the program creation unit showing the window and associated information when the My Shows tab element is actuated according to the teachings of the present invention.

FIG. 4 is a representation of a user interface generated by the program creation unit showing the window and associated information when the Inventory tab element is actuated according to the teachings of the present invention.

FIGS. 9, 10 and 11 are representations of a user interface generated by the design tab element when actuated and showing the window and associated pane elements, along with designated items and associated item data, according to the teachings of the present invention.

FIG. 15 is a representation of a user interface generated by the analysis tab element when actuated and showing the window and associated pane elements according to the teachings of the present invention.

DETAILED DESCRIPTION

Figure 1:
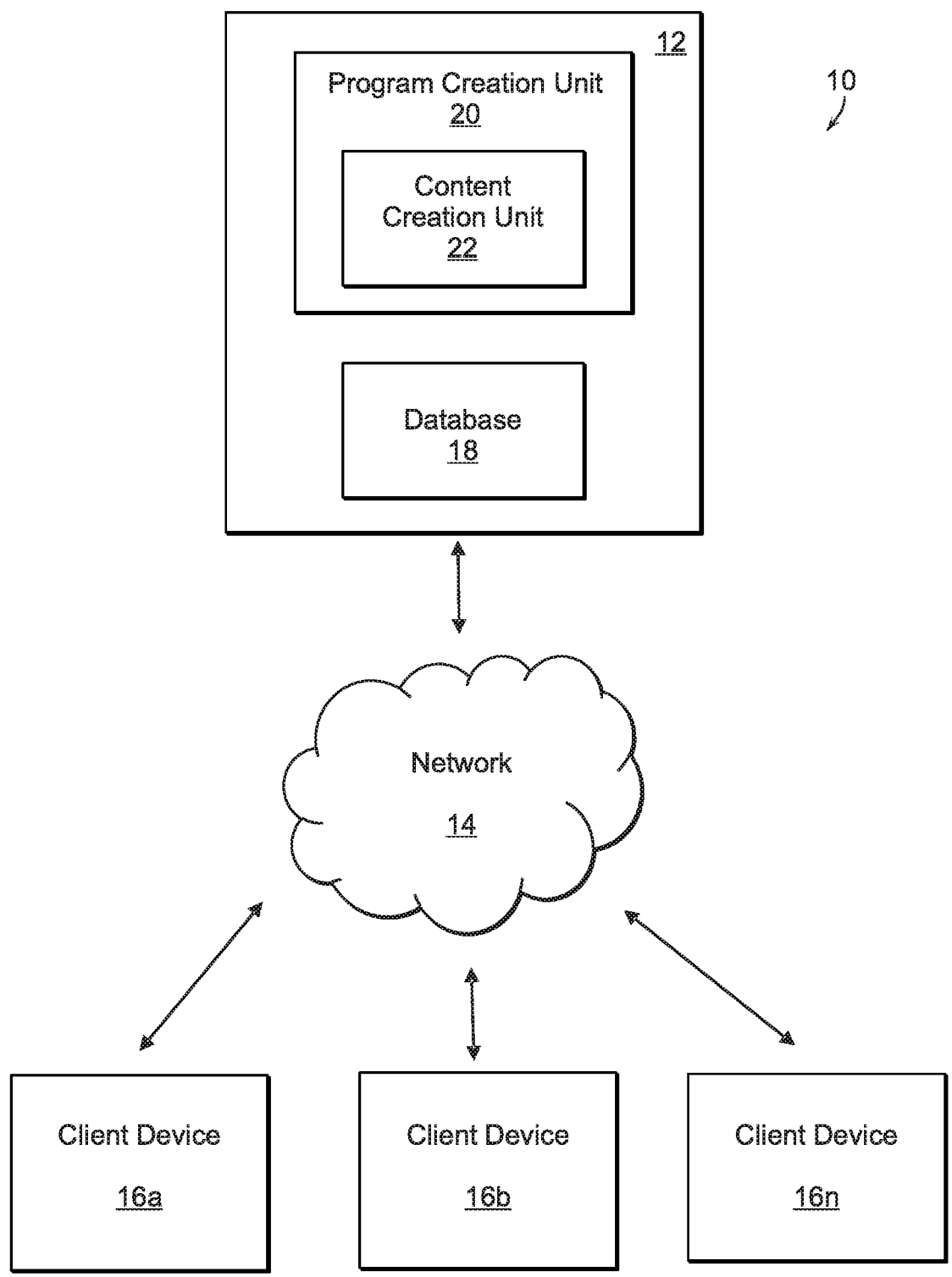
FIG. 1 is a schematic depiction of the content creation system according to the teachings of the present invention.

The present application is related to a system and method for creating and organizing a program that can be broadcast to viewers. The program can be of any selected type and can be for any selected period of time. The user of the present system can create and organize the show using a series of relatively easy to use and understand user interfaces. The program or content creation system 10 of the present invention is broadly illustrated in FIG. 1. The system 10 includes a server 12 connected through a network 14 to one or more client devices, designated as client devices 16a-16n. The server 12 and the client devices 16a-16n can be connected through any suitable connection, including a wired connection, a wireless connection, or any combination thereof.

The client devices 16a-16n can be any suitable display device that includes appropriate hardware and software. For example, the client devices 16a-16n can be a personal computer, laptop, tablet, thin client, and the like. The server 12 can include a database 18 and a program creation unit 20 according to the teachings of the present invention. The database preferably stores information and data related to and capable of being used by the program creation unit. For example, the database can include information associated with particular items that are in stock in the warehouse, including product or item name, product numbers, product quantities, and associated product description. The database can also store if desired video and audio segments or clips associated with the products, or other types of video and audio clips. Hence, the database stores all of the pertinent data necessary for display in the user interfaces of the present invention. The database 18 is intended to represent any type or collection of storage and memory elements. The storage and memory elements can be distributed across the system 10, as is known in the art.

The program creation unit 20 can include a content generation unit 22 that has associated therewith any associated hardware and content generating software necessary to create, organize and process data for creating a program or show. The program creation unit 20 and/or the content generation unit 22 can include selected hardware, including for example processors and memory, and application software that allows the user to create, process, and organize the show or program. As used herein, the term "show" or "program" is intended to include any content that is created, produced and broadcast to people over traditional or conventional transmission media, such as through the Internet, over-the air, cable and/or broadcast channels, and suitable for display on any content viewing device, such as for example through a smartphone, computer, tablet, laptop, television sets and the like. The shows or programs can be scheduled for broadcast ahead of time and appear on electronic guides or other TV listings, and can also be available through streaming services. The shows or programs can be viewed as they are broadcast in real time (e.g., live broadcast), can be recorded on home video or a digital video recorder for later viewing, or can be viewed on demand via a set-top box or other hardware device, or streamed over the Internet. The show or program is typically created, produced or generated by users or producers using suitable software programs, such as content generating software, and according to known production techniques, format and/or sequence (e.g., pre-production, principle photography, and post production).

The program creation unit 20 of the present invention employs suitable application software that is run on the server 12 for displaying on a suitable display device of the client devices 16a-16n. The software generates a series of graphical user interfaces or windows 30 that allow the user to input and view selected information for creating the show or program. For example, in use, the user can log into the content creation system 10 and can then access the content generation software 24. Specifically, the program creation unit 20 includes a content generation unit 22 that stores and/or executes the content generation software 24 of the present invention. The content generation software 24 once loaded provides a series of user interfaces or windows.

FIG. 2 illustrates an initial user interface or window element 30 (herein generally referred to as a window, a frame or a page) generated by the content generation software 24 of the content generation unit 22. The illustrated window 30 and the associated data is displayed on a suitable display device, such as the display of the clients 16, and the specific content in the window is dependent on the identity and priority rights assigned to the specific user. After the user enters their log-in credentials, the content generation software 24 generates the illustrated window 30, which displays a series of tab elements 34 along the top right portion of the window. The tab elements 34 include a Schedule tab element 36 for displaying a schedule of the programs already created and the broadcast dates and times thereof, a My Shows tab element 38 for displaying a list of shows associated with the user in a central pane element 50, an Inventory tab element 40 for displaying inventory related data associated with the items to be sold on the program or were previously sold in the pane 50, a Design tab element 42 for displaying one or more user interfaces that allow the user to create, design and organize a program, an Analysis tab element 44 for displaying data associated with an analysis of the constructed program, and a Live tab element for displaying in a user interface information associated with a live broadcast of the program.

As shown in FIG. 2, the My Shows tab element 38 is selected or actuated by a user by any selected input device and a centrally located pane element 50 is formed or created in the window 30 that extends from the left side of the window to the right side of the window and displays a listing of the programs or shows 54 associated with a selected user, and which are organized in a tabular format. The pane element is below and immediately adjacent the portion of the window that displays the tab elements 34. The shows or programs 54 listed in the pane element 50 can include the programs constructed or generated by the user, or the shows for which the user is responsible. According to an example, the shows 54A and 54B are set forth in the pane element 50. The user interface or window 30 can also display selected information associated with the program or show, including a description of the program 56, the host of the program, the start time 60 and end time 62 of the program, program status 64, and one or more actions 66 associated with the program. By way of example, in the actions 66 section of the pane element 50, a series of soft button indicators 68 can be employed. The soft button indicators 68 can be icons associated with the tab elements 34. For example, the button indicator I can be associated with the Inventory tab element 40, the button indicator D can be associated with Design tab element 42, and the button indicator A can be associated with the Analysis tab element 44. The button indicator R can be associated with a separate or different user interface that allows the user to review and generate a Run Sheet associated with the program. By allowing the user to access the various tab elements 34 through the action buttons 66, the user can access and switch between shows in an expeditious manner.

Figure 3:
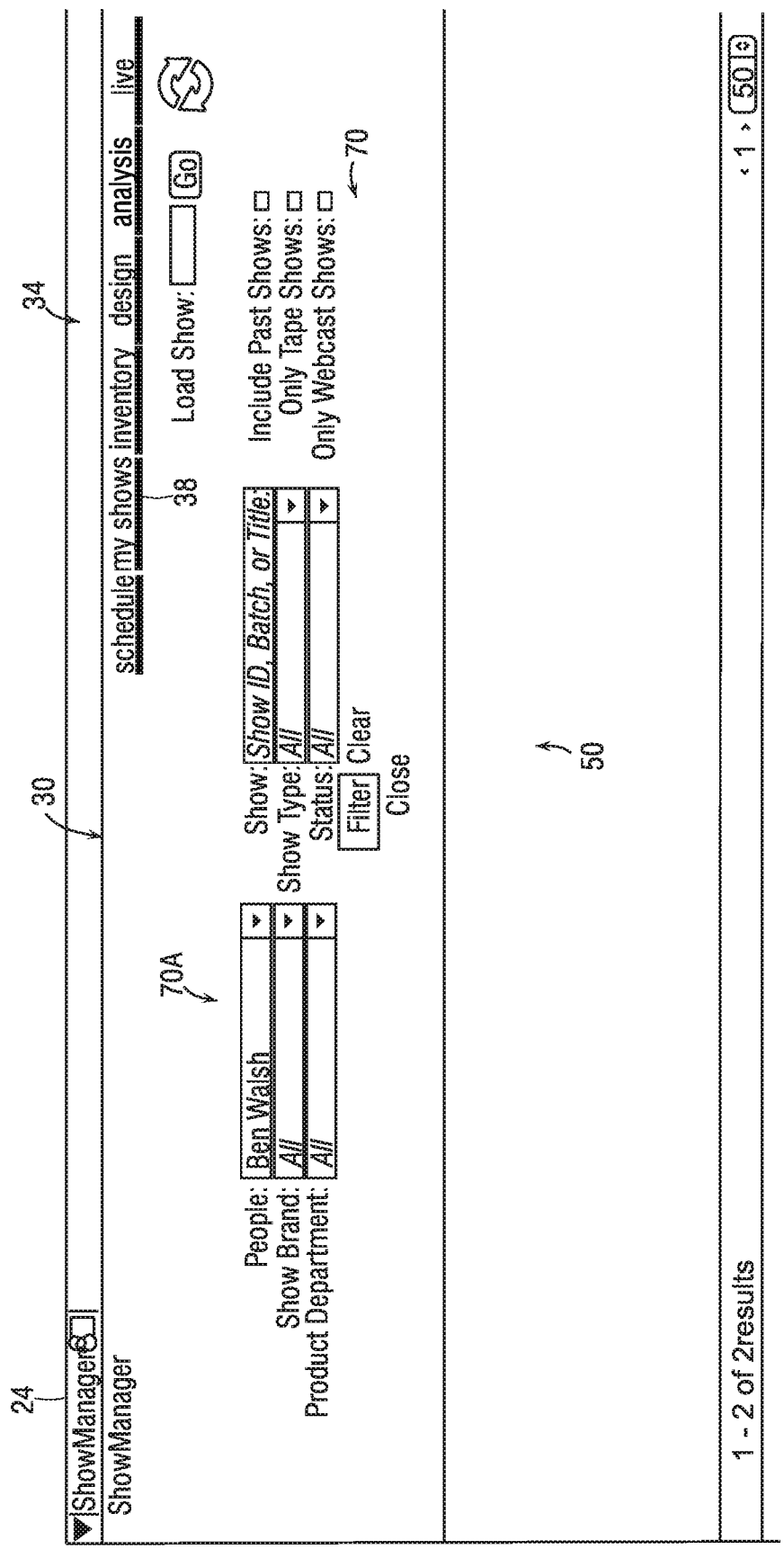
FIG. 3 is a representation of a user interface generated by the program creation unit showing the window and associated search information when the My Shows tab element is actuated according to the teachings of the present invention.

Additionally, the user can access additional search fields associated with the My Shows tab element 38 through a selected user input device. For example, as shown in FIG. 3, the user can access a search field by clicking on the selected user input device (e.g., mouse). The window 30 of the user interface then displays a general search field 70 in the pane element 50. The search field 70 includes a series of pertinent search field elements 70A that allow the user to search programs according to one or more selected metrics using associated search field elements. The search field elements allow a user to search for programs using one or more designated metrics, including the user name, program or show description, product department, the program brand and type, and the program status. The user can also select one or more fields that allow the search result to be further limited to past programs, taped programs, and webcast shows.

Figure 4:
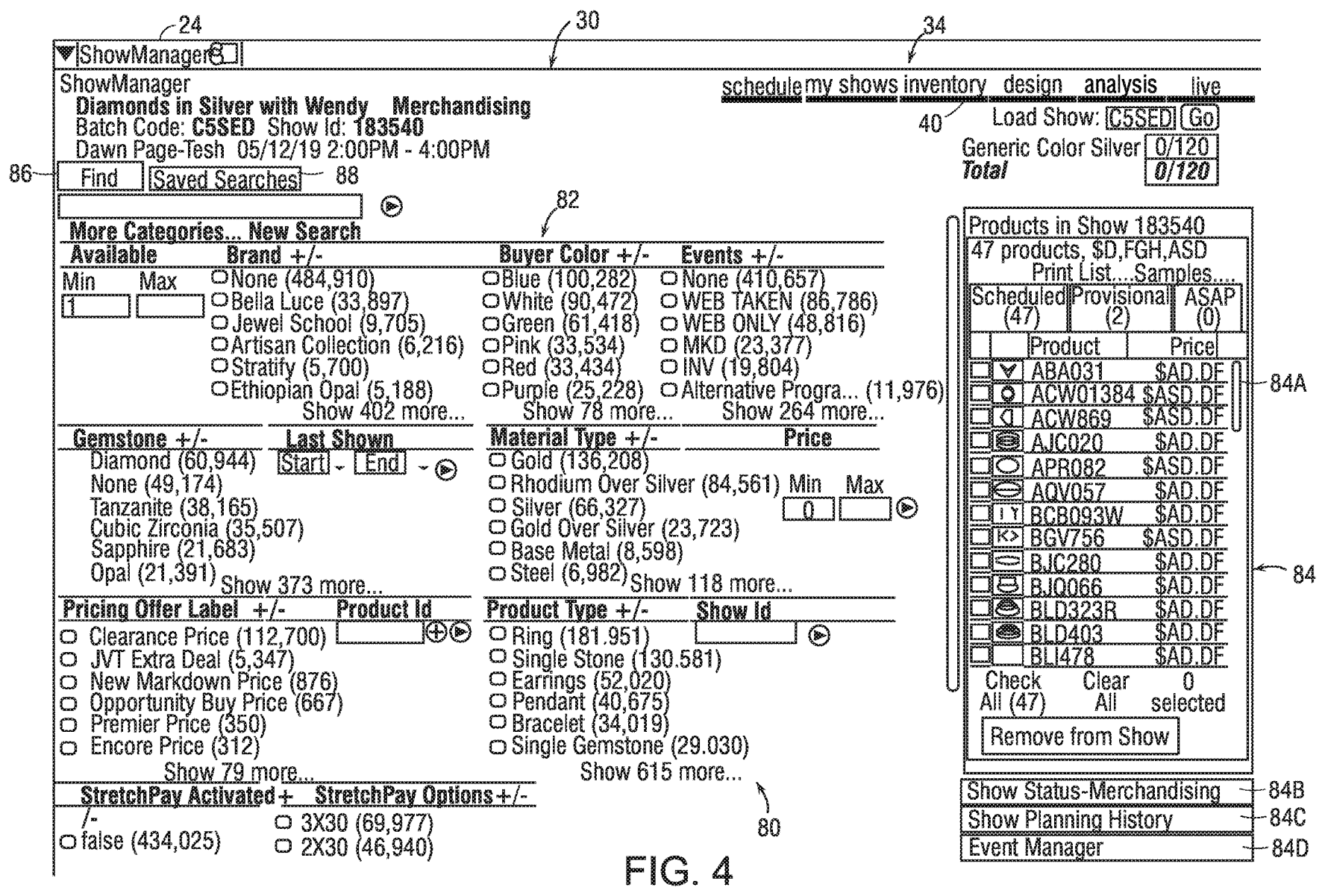

FIG. 4 shows the window 30 when the Inventory tab element 40 is selected or actuated by the user. When actuated, the window 30 includes a pane element 80 that extends from the left side of the window to the right side of the window. The pane element 80 is disposed below and immediately adjacent the portion of the window that displays the tab elements 34. The inventory pane element 80 includes a Find tab element 86 and a Saved Searches tab element 88. The Find tab element 86 allows the user to search and locate selected items in inventory, and the Saved Searches tab element 88 allows the user to save searches that the user performs or constructs. The pane element 80 includes a series of item specific fields 82 organized in selected categories with selected elements or subcategories listed below the category heading, as shown, so as to enable the user to search for and select items that form part of the inventory according to one or more predefined or predetermined attributes. For example, as shown, the item specific fields or categories 82 can include header elements or descriptors that include for example item type, brand name or item, color of the item, material type, item price, as well as other features, including whether the item is eligible for selected financial promotions or incentives, such as installment billing (e.g., StretchPay) options, promotional deals or prices, and the like. The pane element 80 also includes along a right hand side portion of the pane element 80 a series of stacked or overlying fields 84 associated with the formation, generation or construction of the show or program. For example, the overlying fields can include a field 84A illustrating the items that have been selected for a selected show, a field 84B indicating the status of the show and associated merchandising, a field 84C showing the planning history for the program, and a field 84D associated with the event manager. Other functions and features can also be associated with the Inventory tab element 40, such as the ability to add items to the shows, scheduling promotions within the show, and the like.

Figure 5:
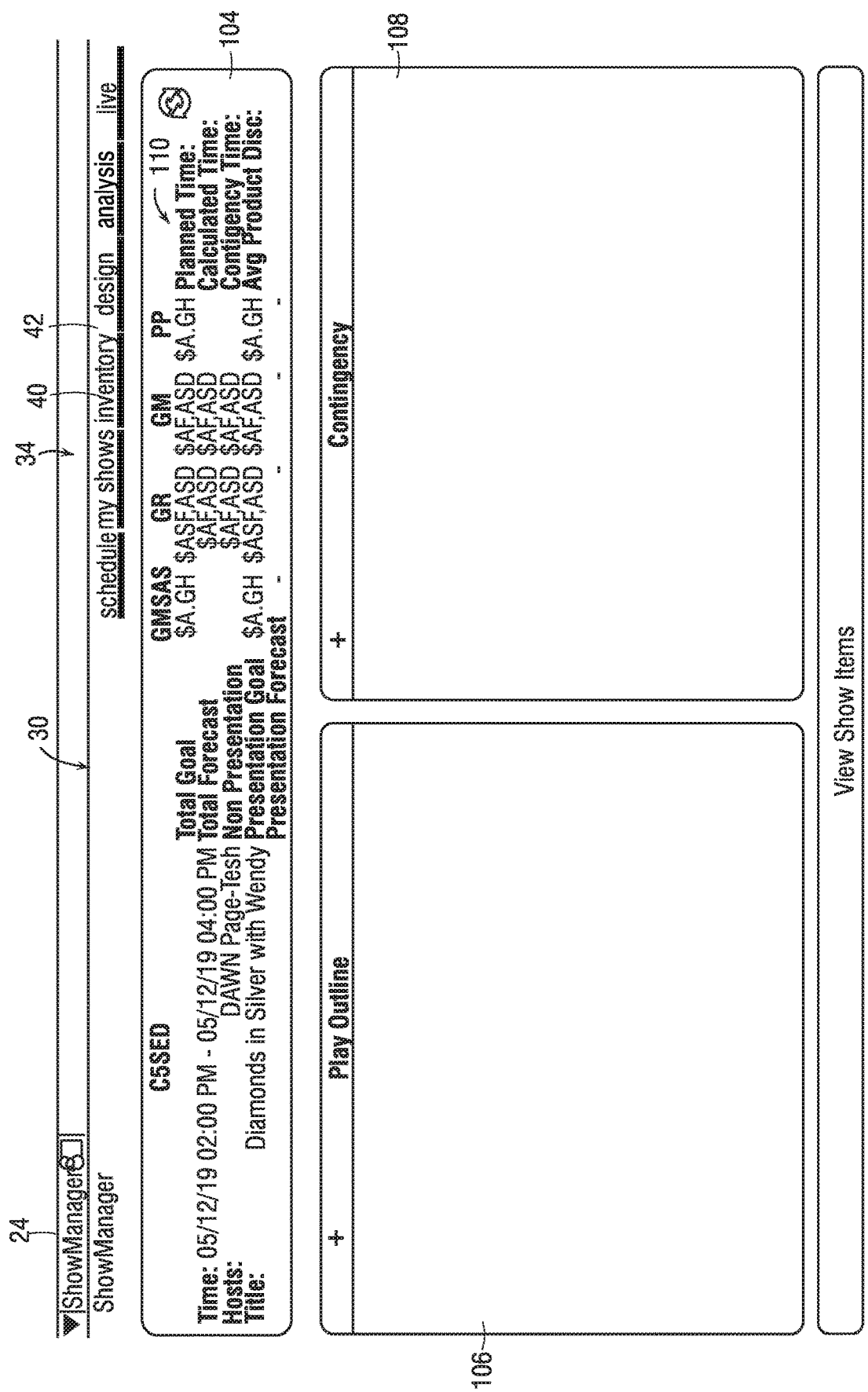
FIGS. 5 and 6 are representations of user interfaces generated by the program creation unit showing the window and associated information when the Design tab element is actuated according to the teachings of the present invention.

Once the items are selected through the Inventory tab element 40, the user can select or actuate the Design tab element 42 in order to actually construct the program or show. The program to be constructed can be composed of a series of segments or plays. The program segments or plays form a predetermined part of the overall program. The plays can be named, timed and sequenced to form the program. The play can contain ordered elements, including items or products and associated data and content. The plays can be constructed to have a selected duration, where the plays can have the same duration or the duration of the plays can vary relative to each other across the program. The content creation unit 22 generates and displays the window 30, as shown in FIG. 5. The window 30 has a series of pane or frame elements, including a top pane element 104, a left pane element 106, and a right pane element 108. The top pane element is disposed below and immediately adjacent to the portion of the window that displays the tab elements. The left pane element and the right pane element are disposed below the top pane element and extend from left to right across the window 30. The top pane element 104 can display a series of financial metrics or data 110 associated with the items or products that are shown as part of the program, and correspondingly as part of the plays. In an illustrative example and for the sake of simplicity, the program that is to be created is associated with the sale of jewelry. Those of ordinary skill in the art will readily recognize that the teachings of the present invention can be applied to the sale and display of other types of items as well. The financial metrics can include the gross revenue of the play or program, the gross margin of the play or program and the price point of the play or program, and the financial goal or forecast for the play or program. Other program or play related information can be displayed as well in the pane element. The left pane element 106 can include a header (e.g., Play Outline) and can display an outline of the play, including the number and types of plays that form part of the program. The plays can include items that can be selected using the Inventory tab element 40. The right pane element 108 can include a header element (e.g., Contingency) and can display the contingency plays and items that can be displayed or form part of a specific play or program. The contingency plays can be employed if the user decides to switch plays in the play outline 106 with one or more plays listed in the contingency pane element 108. The plays can be moved between the play outline 106 and the contingency pane element 108 using a user selection device, such as by using a mouse through drag and drop capabilities. The financial metric data 110 in the top pane element 104 can be updated in real time as the plays and associated items are selected in the play outline, in order to achieve a selected forecasted financial performance for the program or play.

Figure 6:
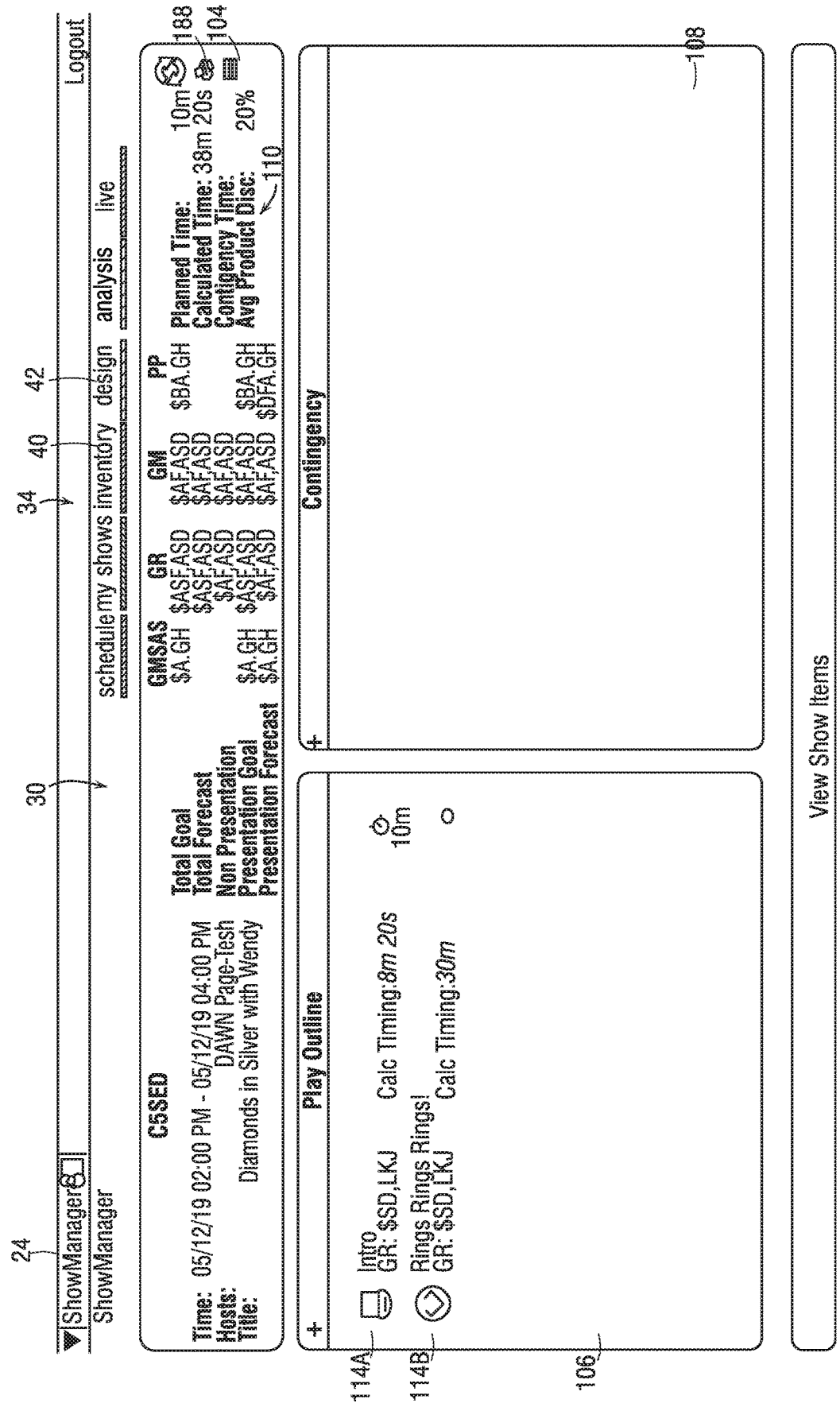

As the items are selected through the Inventory tab element 40, the items can then be placed or moved into a selected play, which in turn can be displayed in the play outline pane element 106. As shown in FIG. 6, the pane elements 106 and 108 can also house other additional types of data, including audio clips, video clips, and general background information about or related to the items to be displayed or shown as part of the play and program. The additional types of data can be stored in the database 18 of the server 12. The play outline pane element 106 can include, for example, plays 114A and 114B. The play 114A can be for example content associated with an introduction of the program and the play 114B can include content associated with one or more items, including for example rings. The content can be a description of any suitable aspect of the show, including the general theme of the show (e.g., types of jewelry) or about specific items or types of items that are to be displayed or shown.

Figure 7:
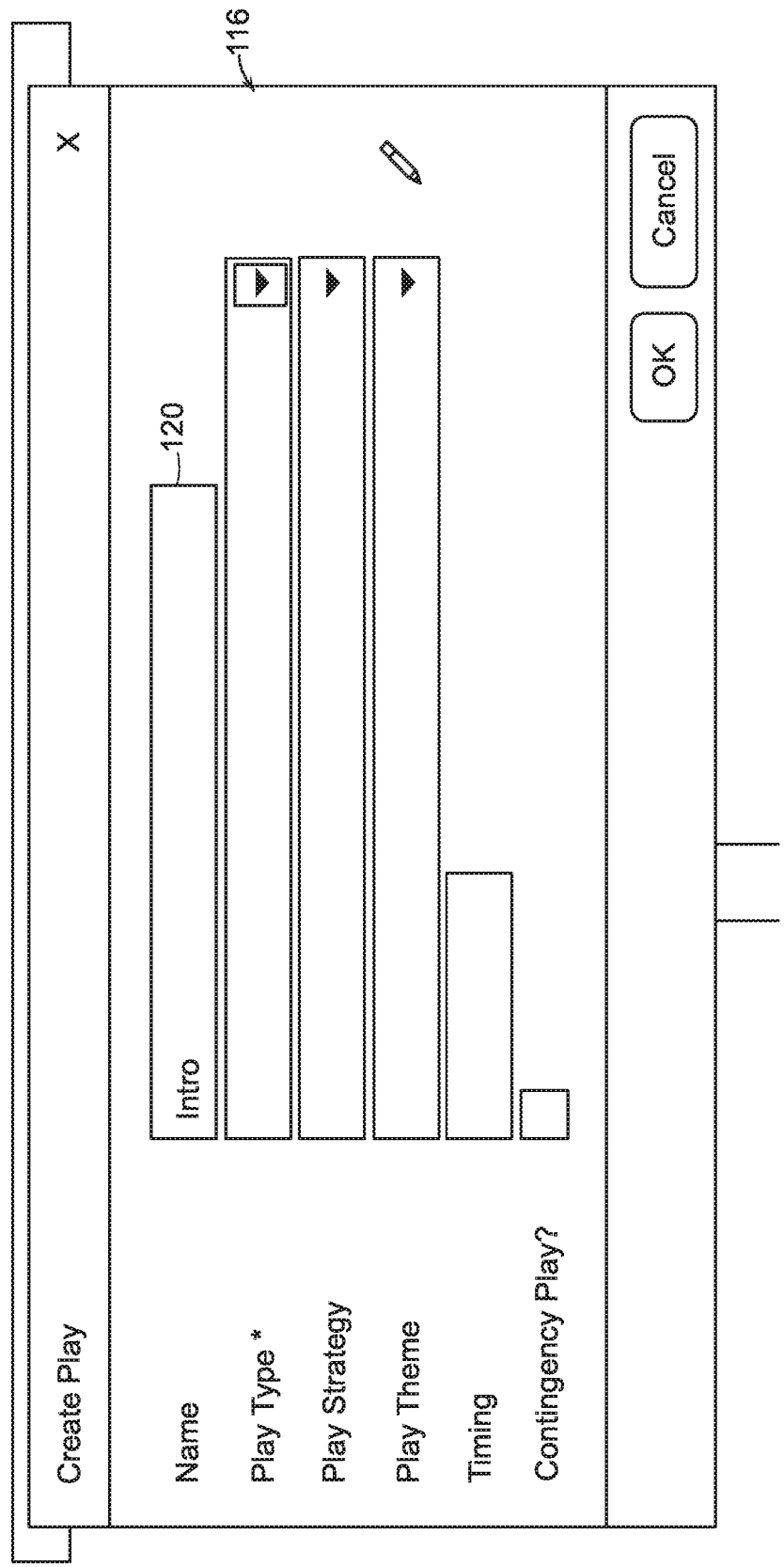
FIGS. 7 and 8 are representations of a user interface illustrating a fillable dialogue box according to the teachings of the present invention.
Figure 8:
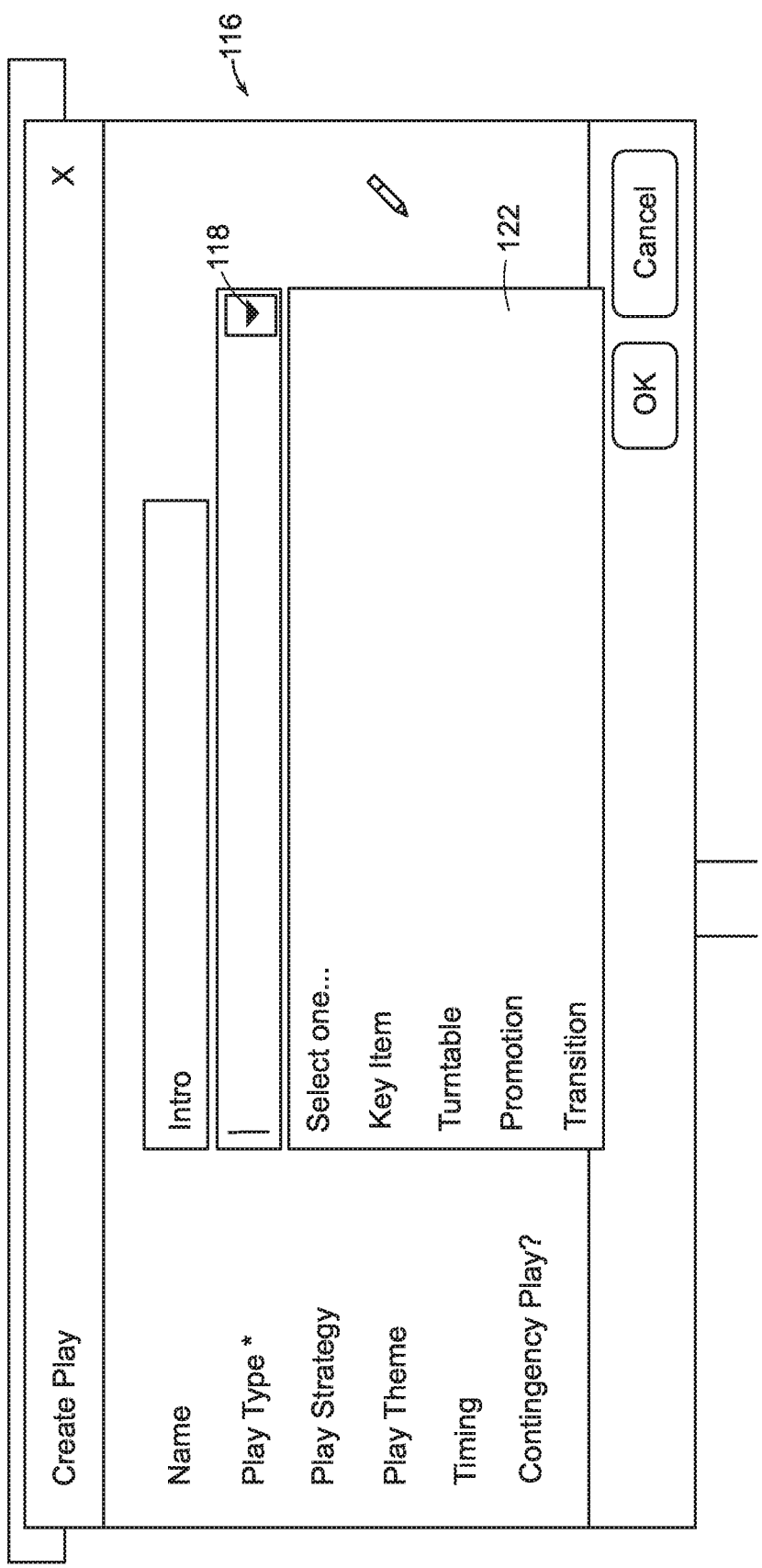

In order to create the play or segment, the user can right click on one or more of the illustrated pane elements, and then a fillable dialogue box 116 is displayed, as shown in FIGS. 7 and 8. The dialogue box 116 can be configured to request selected types of information, including for example the Name of the play, the Play Type, the Play Strategy, the Play Theme, and the Timing of the play. The Name of the play provides a text box 120 for the user to enter a name of the play. One or more of the displayed types of information can have drop down menus associated therewith for selection of one or more pre-stored types of data. For example, as shown in FIG. 8, the Play Type can include a drop down menu 118 that provides the user with pre-stored selected options 122 for indicating the type of play, including Key Item, Turntable, Promotion and Transition types of plays, that can be created. The Key Item play type allows the user to identify an important item that is displayed or showcased during the play or program. The Turntable play type indicates that a turntable is used to display one or more items. The Promotion play type corresponds to a video and/or audio segment that can be used to promote one or more items on the play or program, or to promote related products or services. The Transition play type corresponds to transition information between plays that form part of the program or between programs. The Play strategy corresponds to the overall strategy that is to be employed for the created play and program. For example, this can include details of how the play is constructed (e.g., ensemble items, high-low pricing strategy, and quick sell pricing strategy) or provide details about the purpose of the products or about the product sequence in the play. The Play Theme play type corresponds to the theme to be employed for the play. The Timing corresponds to the duration of the play, and the Contingency Play corresponds to reserve or alternate plays that can be used in the program or show.

Figure 9:
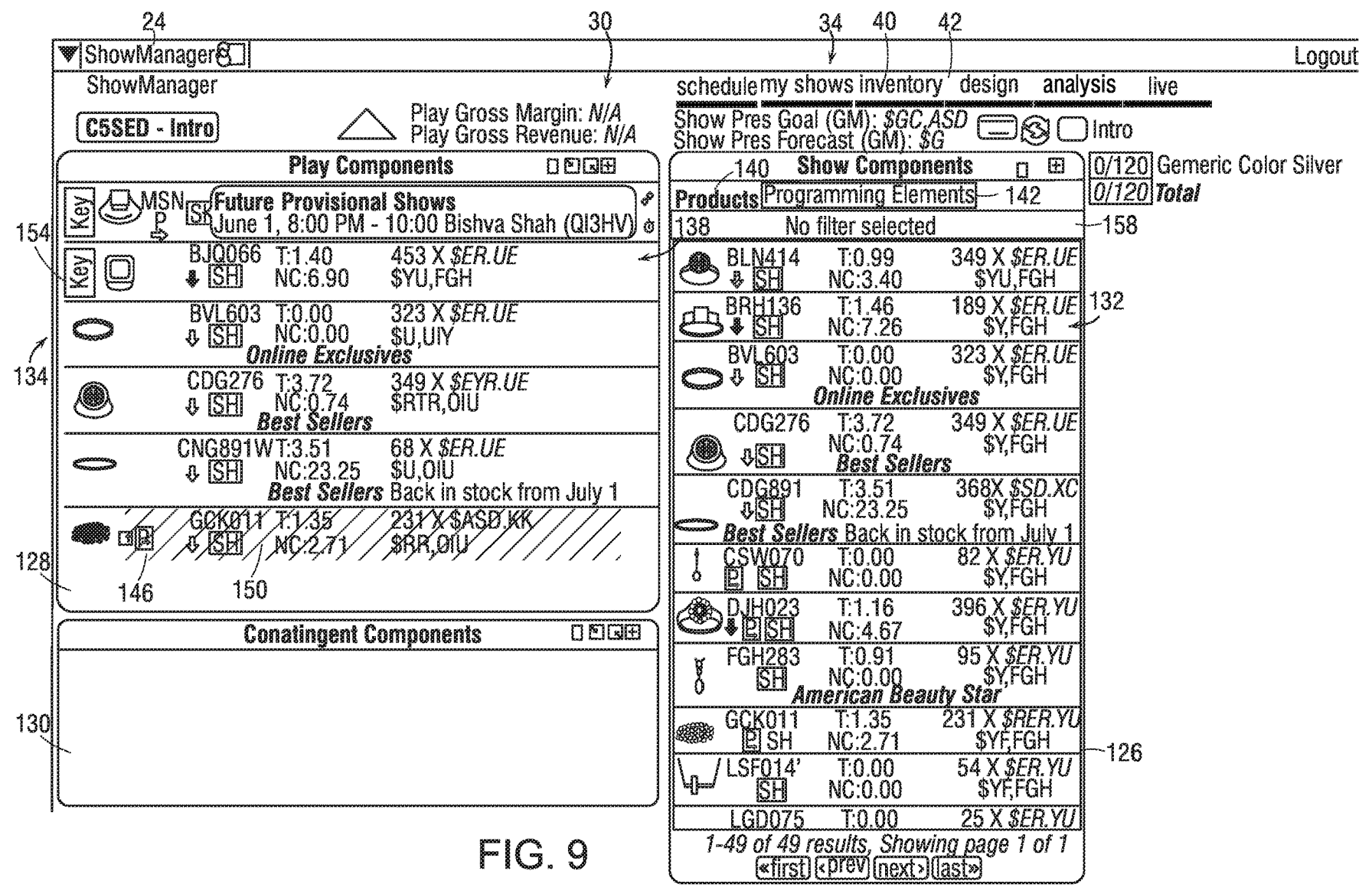
Figure 10:
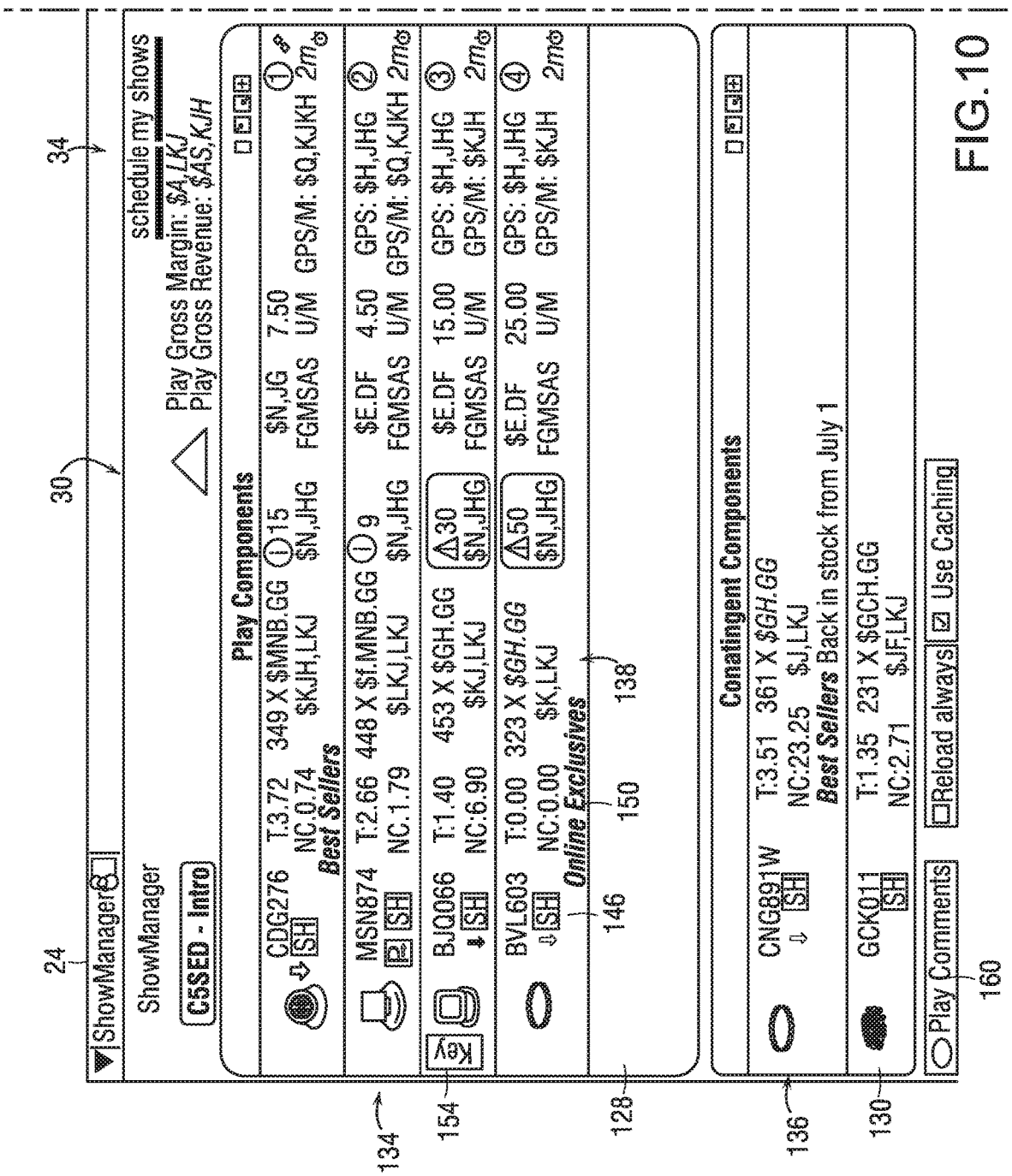
Figure 11:
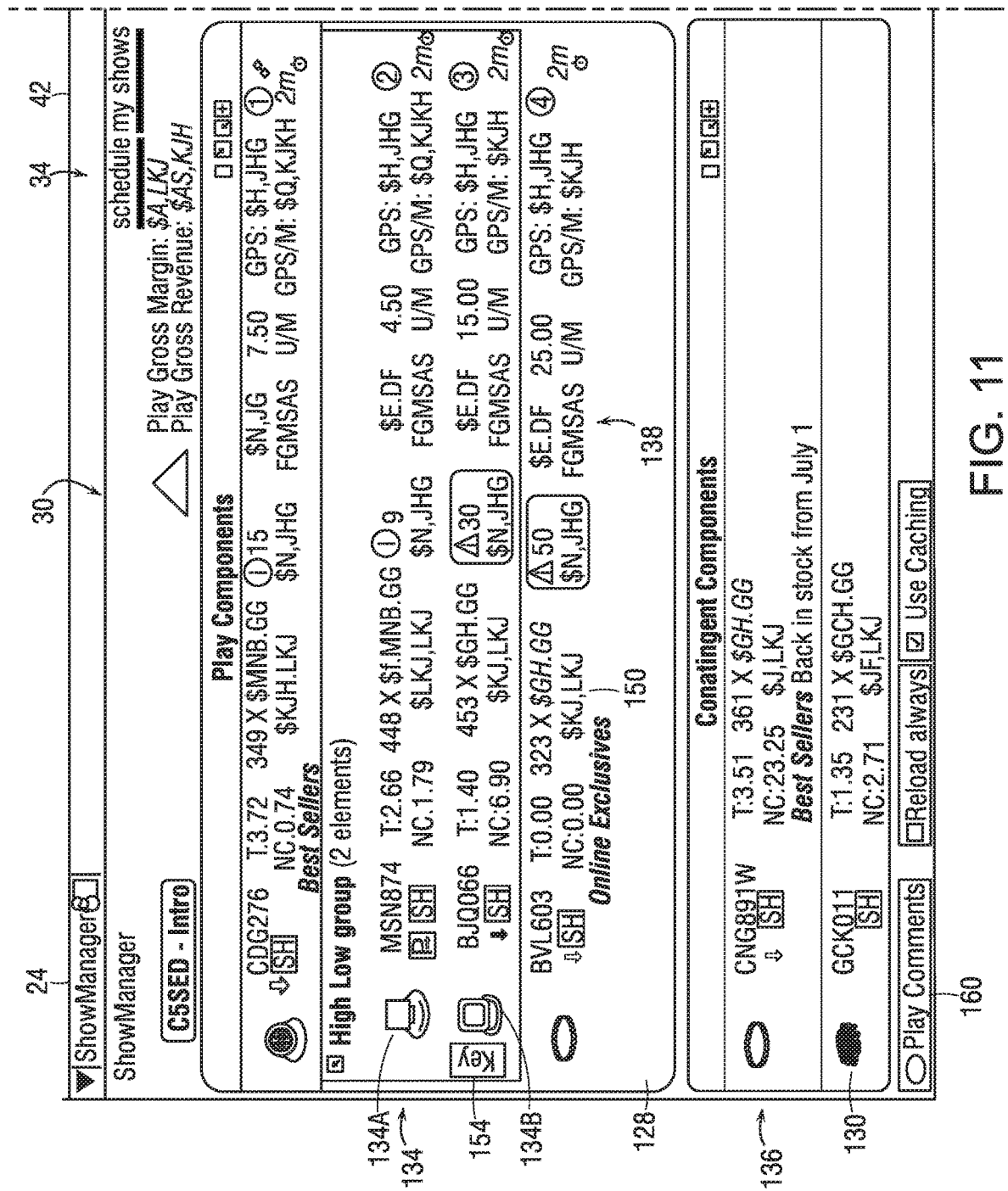

FIGS. 9-11 illustrate the window 30 when the user double clicks on the window area 30 of FIG. 5. In this interface, the window 30 has a set of three main pane elements, including a right pane element 126 and first and second left pane elements 128 and 30, respectively, wherein the first and second left pane elements 128, 130 are stacked, and wherein the right pane element 126 and the first left pane element 128 are disposed below and immediately adjacent to the portion of the window that displays the tab elements 134. The right pane element has a heading (e.g., Show Components), the first left pane element has a heading (e.g., Play Components) and the second left pane element 130 has a heading (e.g., Contingent Components). The window 30 includes a wide variety or array of information relevant to the play or program, and can include full drag-and-drop capabilities. This enables the user to relatively easily and quickly switch items or components between the pane elements 126, 128, 130. The information that can be displayed in the pane elements can include forecasted financial data concerning the items that are selected to form part of the play.

The user can select items from the Inventory tab element 40 and place them in one or more of the pane elements 126, 128, 130. For example, the user can select one or more particular items from inventory and the items 132 are then displayed in the Show Components pane element 126. The items 132 that are listed in this pane element 126 are of specific interest to the user and may form part of the play or program. Once the items 132 of interest are displayed in the Show Component pane element 126, the user can then select one or more of the listed items 132 and place the items in the Play Components pane element 128, the Contingent Components pane element 130, or both, using the drag and drop capabilities of the system. The items 134 listed in the Play Components pane element 128 can form part of the play. The items 136 listed in the Contingent Component pane element 130 are contingent items and function as potential alternative items that the user can use in the play and program, whether as a replacement for one or more items listed in the Play Components pane element 128 or as a supplement to the items listed in the Play Components pane element 128.

Each of the items 134 can have associated therewith selected item data 136, 138. The item data can include information about the product including product type, color, and price, and can include visual data associated with the item. According to one embodiment, the information can also include icons 146 indicating the presence of selected promotions associated with the items. For example, the icons can indicate whether a multiple payment option SX is associated with the item, whether a shipping promotion SH is associated with the item, whether there is a discount (green arrow) or clearance price (red arrow) associated with the item, and whether additional promotions (blue card) are associated with the item. The item data 136, 138 can also include selected financial or forecast data 150 associated with each of the items 134. The financial data 150 can include indications concerning gross margin and new customers. Further the actual sales data associated with the items can be used as feedback information when forecasting transactional data associated with each item in the play, and hence of the entire play and program.

Further, as shown in FIGS. 9-11, one or more of the items 134 listed or displayed in the Play Components pane element 128 can be designated as a Key Item 154. The Key Item 154 designation enables the user to select or designate an item to be an important or key item in the play. For example, the Key Item 154 can be an item that other items 134 are related to or the items 134 are complementary in some attribute or aspect to the Key Item 154. The content creation system 10 also enables the user to link together multiple items that are selected to form part of the play. For example, as shown in FIG. 11, the user can designate or select two or more items 134A, 134B of the items 134 that are connected or linked in some manner. By way of example, the items 134A, 134B can be part of a promotion that forms part of the play, such as a high-low promotion.

The filter field 158 of the Show Components pane element 126 allows the user to search selected items in the inventory according to selected attributes. For example, the user can search the items 132 based on item type, color, size, brand name, and the like. This enables the user to quickly and easily search and find items that the user may wish to employ to form part of the play.

Figure 12:
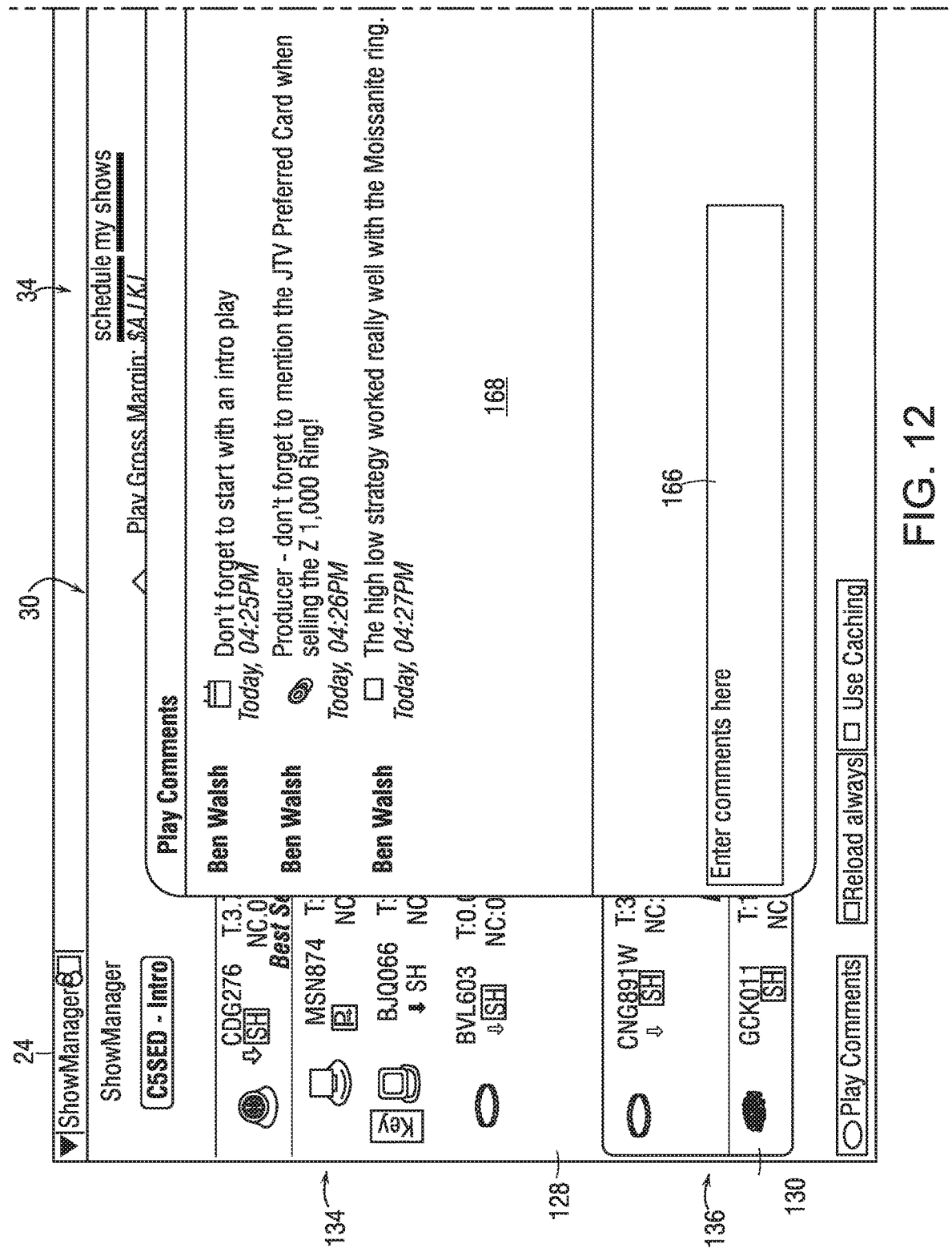
FIG. 12 is a representation of a user interface generated by the design tab element when actuated and showing a window having a play comments frame or field according to the teachings of the present invention.
Figure 13:
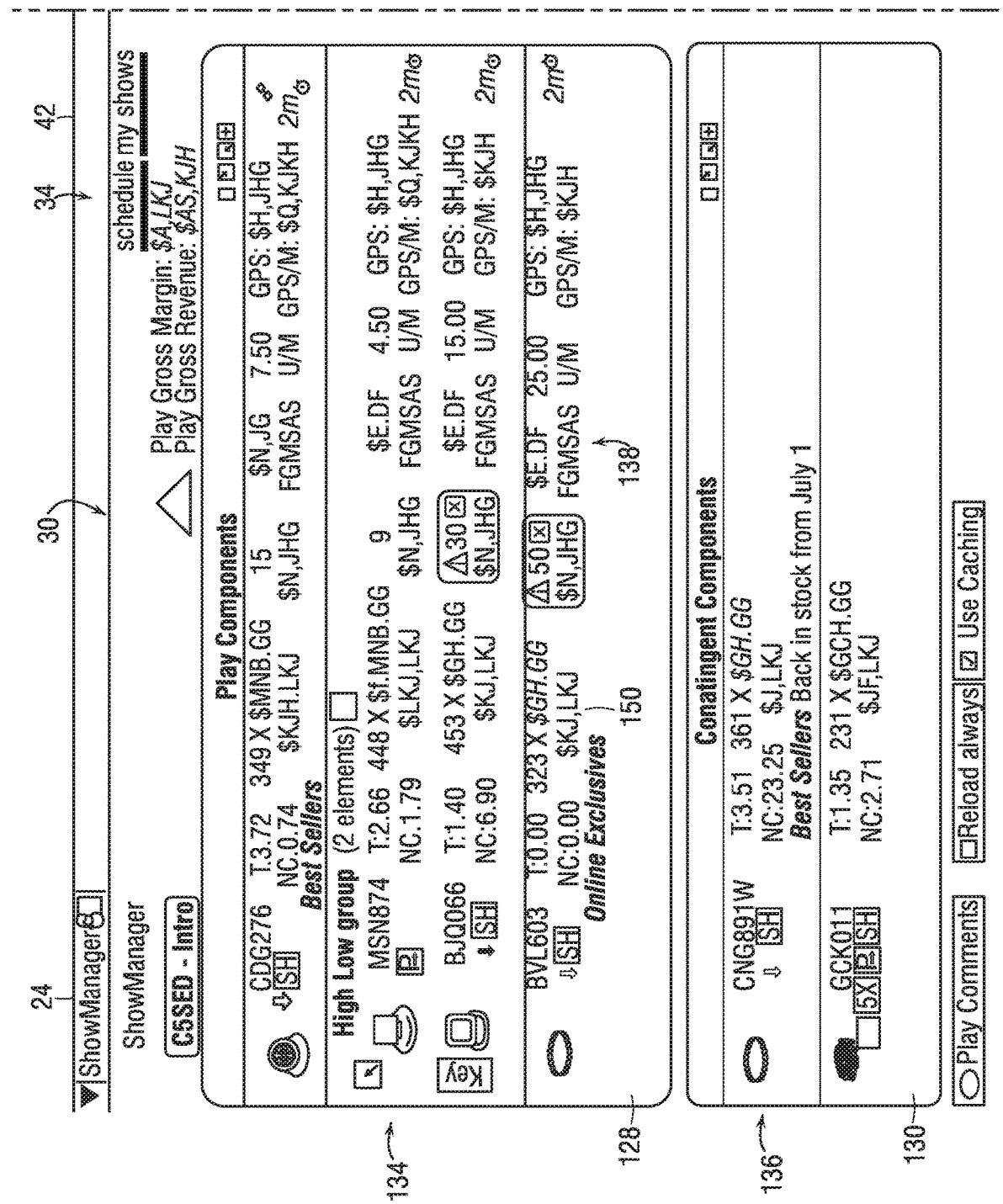
FIG. 13 is a representation of a user interface generated by the design tab element when actuated and showing the window and associated pane elements according to the teachings of the present invention.
Figure 13:
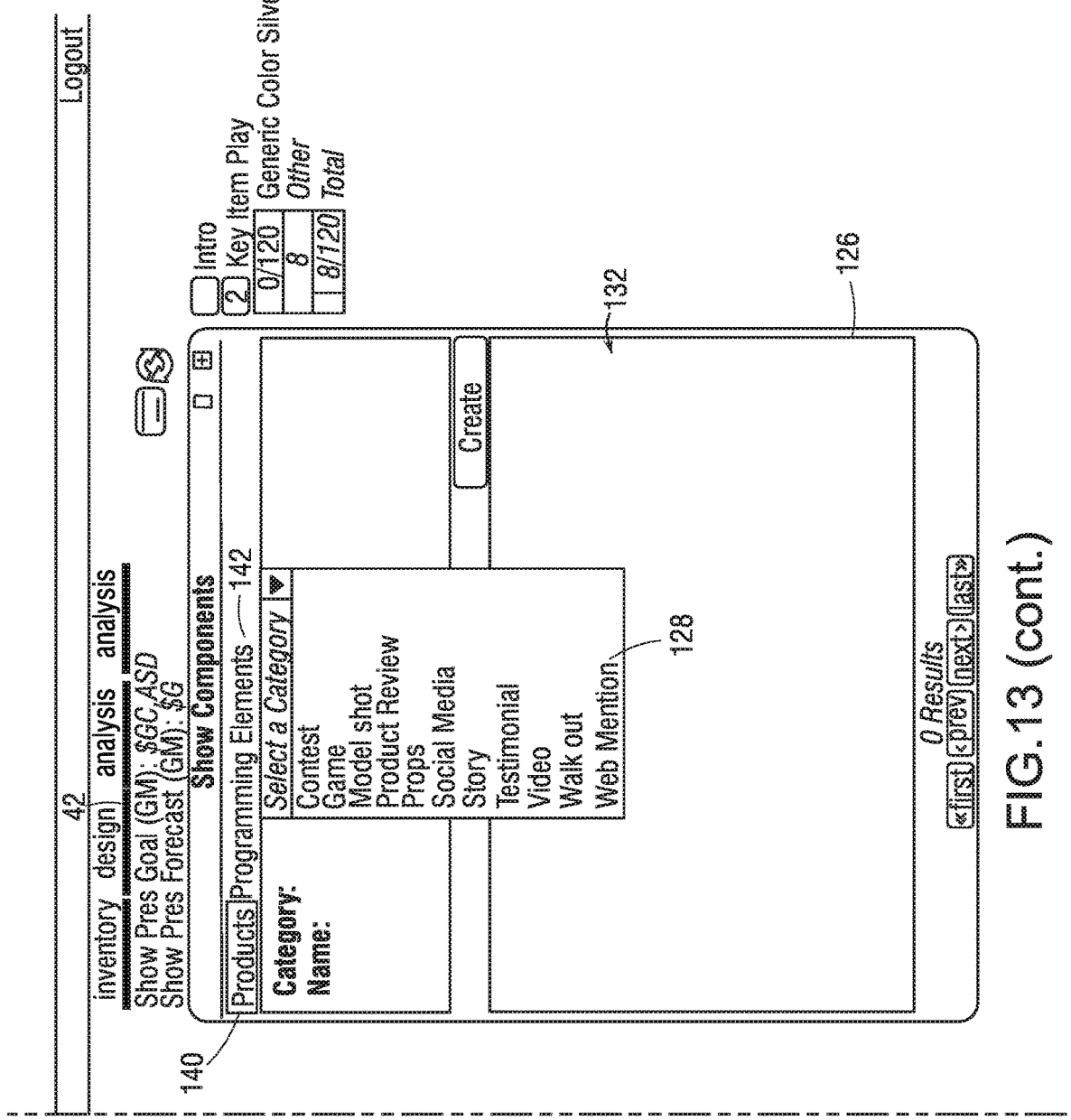

FIGS. 10-12 also show that the window 30 displays a Play Comments button element 160. The Play Comments button element 160 when selected by the user displays a Play Comments frame or field 164 that is generated by the content creation unit 22. The Play Comment field 164, FIG. 12, allows a user to input selected comments on the play that is being created through a text input field 166. The comments when entered appear in a commentary display area 168 when the input is entered into the text input field 166 and the user selects the Comment button element 170. The user can also search and access prior created shows so as to add commentary through the Show search field 172.

As shown in FIGS. 9-13, the Show Component pane element 126 can have multiple tab elements associated therewith. For example, the Show Component pane element 126 can have a Products tab element 140 and a Programming Elements tab element 142. The Products tab element 140 displays the preselected items 132, and the Programming Elements tab element 142 allows the user to select or create programming components of the play, including for example the ability to select video components or product views, to form part of the play. The Programming Elements tab element 142 when selected invokes separate Category and Name fields to be displayed in the pane element 126, FIG. 13. The Category has a drop down menu that includes a number of selectable menu items 178 that form a library that can be selected by the user.

Figure 14:
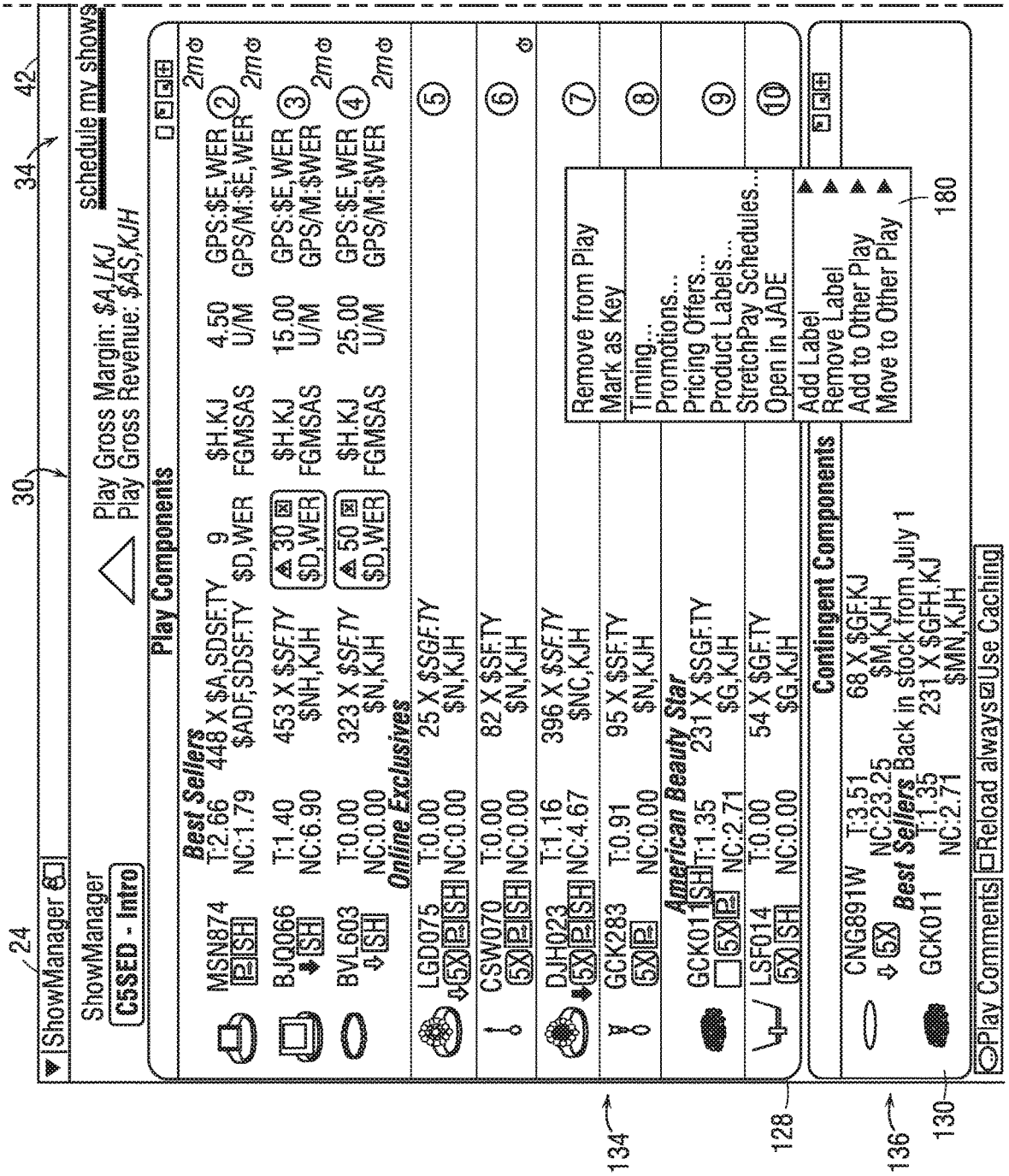
FIG. 14 is a representation of a user interface generated by the design tab element when actuated and showing the window and associated pane elements and menu options according to the teachings of the present invention.

As shown in FIG. 14, at any point during the creation of the play, the user can call a menu 180 in the window 30 by right clicking on any area of the window. The menu 180 can include a number of options that can be selected by the user. For example, the menu 180 can include the ability to add, remove or move a constructed play, mark an item as a Key Item 154, add or remove item labels, add pricing or promotional offers, and construct stretch pay schedules.

With reference to FIG. 15, the content creation unit 22 of the present invention allows a user to select the Analysis tab element 44 from among the tab elements 34. When selected, the window 30 displays a number of metrics 182 associated with the play and the items forming part of the play. For example, the window 30 displays the Product Types in the play or plays, including the number of items of each type, the specific plays created for the program, as well as other related information. The related information can include various types of financial information 184 associated with the items.

Figure 16:
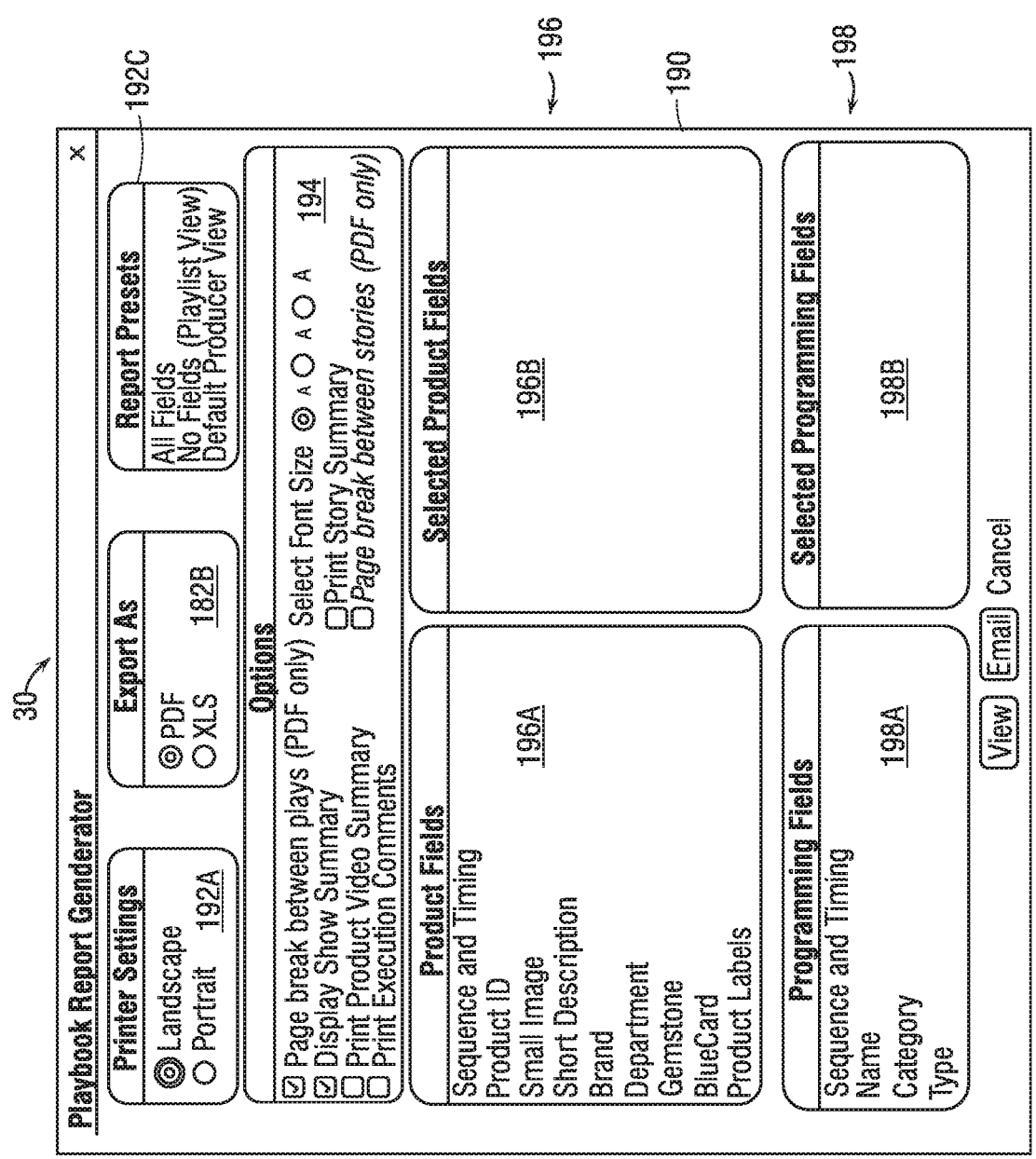
FIG. 16 is a representative user interface displaying a run sheet generated by the content generation system of the present invention.

The content creation system 10 of the present invention can also generate a run sheet of the plays or programs created by the user. As shown in FIGS. 2, 6 and 16, the run sheet 190 can also optionally be generated by selecting a printer icon 188 as part of the top pane element 104, FIG. 6, or by selecting the run sheet button indicator R, FIG. 2. The run sheet 190 is a collated or collection of information in a sheet format or form that the allows the user, producer or host of the program or show to plan and execute the program. The run sheet 190 is a dynamic collection of information that can be customized by the user to include preferred information corresponding to the plays, items in the plays, format of the plays and overall program, and the like. The run sheet 190 can include printer settings and report preset and default settings. The runs sheet 190 can also include a set of selectable options that include whether page breaks are required in the report, display or print show summaries, and print execution summaries that can be created by the user. The run sheet 190 further includes product fields and programming fields.

For example, as shown in FIG. 16, the illustrated exemplary run sheet 190 includes a window 30 that has a selected series and arrangement of pane elements. The window 30 can include a series of adjacent pane elements 192A, 192B, 192C located along a top portion of the window 30. The pane element 192A can be include a plurality of printer settings, allowing a user to select landscape and portrait orientation settings for the run sheet. The pane element 192B can include document export settings, thus allowing the user to export the run sheet in PDF file format or XLS file format (e.g., Microsoft Excel format). The pane element 192C can include a Report Presets pane element 192C that allows the user to preset the report fields, including All fields, No fields, and Default fields options.

The window 30 can also include immediately adjacent to and below the top pane elements a first intermediate pane element 194 that allows the user to select from among a plurality of report options, including for example for inserting page breaks into the report, providing a Show Summary, selecting font size or style, printing product summaries, such as video summaries or audio summaries.

The window 30 can also display one or more second intermediate pane elements 196 immediately adjacent to and below the first intermediate pane element 194. The second intermediate pane elements can include a pane elements 196A and 196B. The pane element 196A can include information associated with the product or items to be sold or displayed during the show. The Product Fields can include for example sequence and timing of the items, product or item ID, image, description, brand, item department, gemstone information, labels and the like. The other pane element 196B an list the product or item fields selected in the pane element 196A. The window can also include on or more bottom pane elements 198 for displaying to the user additional show data and options. For example, the bottom pane element 198 can include bottom pane element 198A that displays options associated with the show and/or segment, such as for example the sequence and timing of items or the segments, name, category, and type. The pane element 198B can list or display the programming fields selected in pane element 198A by the user.

Exemplary Hardware Embodiments

Following below and referenced above are more detailed descriptions of various concepts related to, and embodiments of, a program or content creation system 10 for creating content, such as plays or segments, that form part of a program that is subsequently broadcasted. It should be appreciated that various concepts introduced above and discussed in greater detail below may be implemented in any number of ways, as the disclosed concepts are not limited to any particular manner of implementation. Examples of specific implementations and applications are provided below primarily for illustrative purposes and for providing or describing the operating environment of the alternative trading system of the present invention. Each of the components or elements of the system 10 of the present invention can be implemented using one or more of the foregoing electronic devices, including for example, one or more clients, servers, storage or memory elements, and the like. The system of the present invention can include or be connected to one or more storage elements in the form of a database. As is known, a database is an organized collection of data that is generally stored and accessed electronically from a computer system. As used herein, the storage element can include a database.

Figure 17:
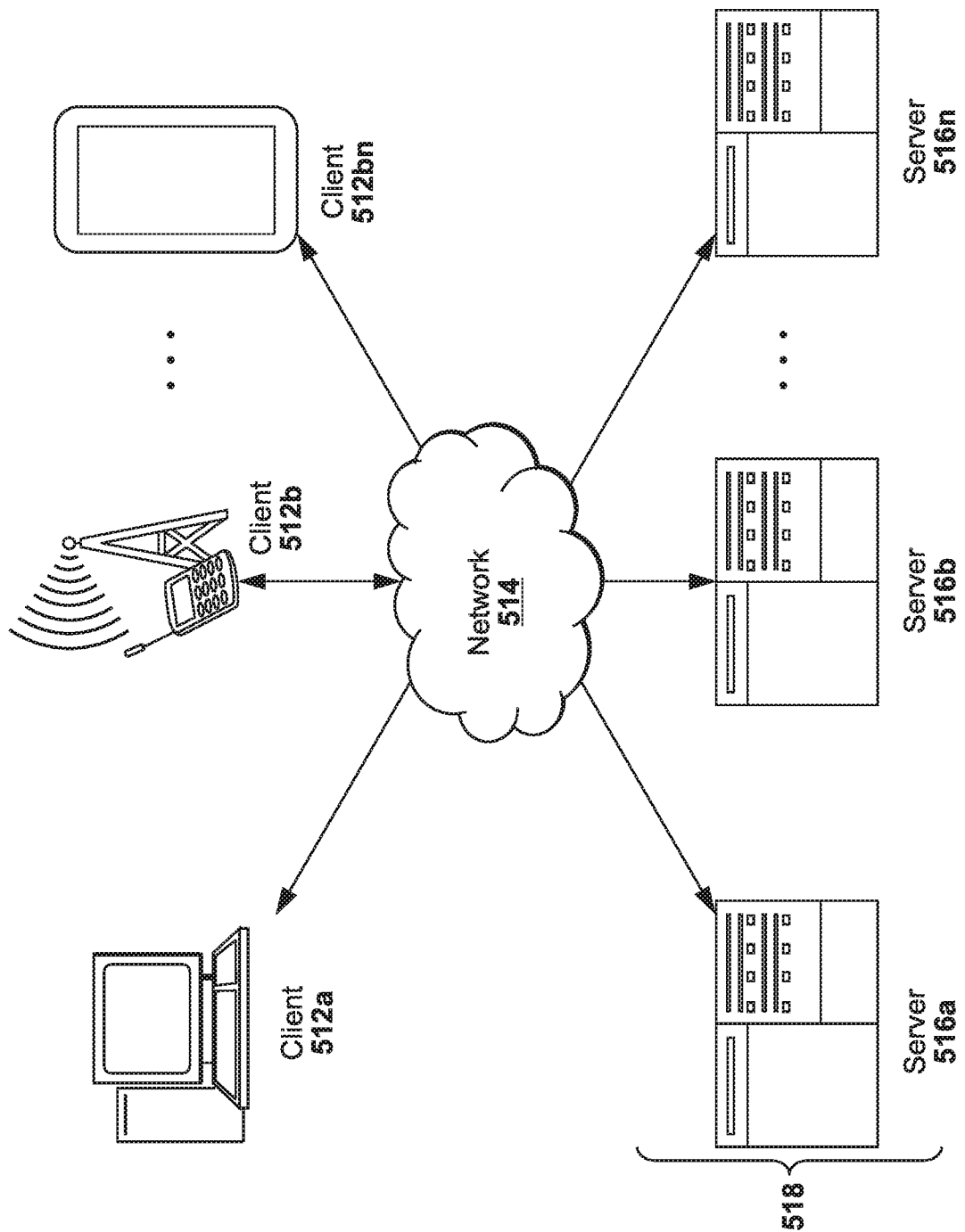
FIG. 17 is a schematic block diagram depicting an embodiment of a network environment comprising client devices in communication with servers through a network arrangement.

Consistent with the foregoing inventive embodiments, it is helpful to describe aspects of the operating environment as well as associated system components (e.g., hardware elements) in connection with the methods and systems described herein. The content generation system 10 of the present invention can be implemented in a network environment as follows. Referring to FIG. 17, an embodiment of a network environment is depicted. In brief overview, the illustrated exploring network environment includes one or more clients 16a-16n and 512a-512n (also generally referred to as local machine(s) 512, client(s) 512, client node(s) 512, client machine(s) 512, client computer(s) 512, client device(s) 512, endpoint(s) 512, or endpoint node(s) 512) in communication with one or more servers 12 and 516a-516n (also generally referred to as server(s) 516, node 516, or remote machine(s) 516) via one or more networks 14 and 514. In some embodiments, a client 16a-16n and 512 has the capacity to function as both a client node seeking access to resources provided by a server and as a server providing access to hosted resources for other clients 16a-16n and 512a-512n. The clients can be any suitable electronic or computing device, including for example, a computer, a server, a smartphone, a smart electronic pad, a portable computer, and the like, such as the computing device 600. The content creation system 10 of the present invention allows a user to create a program that includes a plurality of plays or segments for subsequent broadcast.

Although FIG. 17 shows a network 14 and 514 between the clients 16a-16n, 512 and the servers 12, 516, the clients 512 and the servers 516 may be on the same network 14, 514. In some embodiments, there are multiple networks 514 between the clients 16a-16n, 512 and the servers 12, 516. In one of these embodiments, the network may be a private network or the network may be a public network. In another of these embodiments, a network 514, 514' may be a private network and a public network. In still another of these embodiments, networks 514 and 514' may both be private networks.

The network 14, 514 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 14, 514 may be any type and/or form of network. The geographical scope of the network 514 may vary widely and the network 514 can be a body area network (BAN), a personal area network (PAN), a local-area network (LAN), e.g. Intranet, a metropolitan area network (MAN), a wide area network (WAN), or the Internet. The topology of the network 514 may be of any form and may include, e.g., any of the following: point-to-point, bus, star, ring, mesh, or tree. The network 514 may be an overlay network, which is virtual and sits on top of one or more layers of other networks 514'. The network 514 may be of any such network topology as known to those ordinarily skilled in the art capable of supporting the operations described herein. The network 514 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 514 may be a type of a broadcast network, a telecommunications network, a data communication network, or a computer network.

In some embodiments, the network system may include multiple, logically-grouped servers 12, 516. In one of these embodiments, the logical group of servers may be referred to as a server farm 518 or a machine farm 518. In another of these embodiments, the servers 516 may be geographically dispersed. In other embodiments, a machine farm 518 may be administered as a single entity. In still other embodiments, the machine farm 518 includes a plurality of machine farms 518. The servers 12, 516 within each machine farm 518 can be heterogeneous, and one or more of the servers 516 or machines 516 can operate according to one type of operating system platform (e.g., WINDOWS NT, manufactured by Microsoft Corp. of Redmond, Wash.), while one or more of the other servers 516 can operate according to another type of operating system platform (e.g., Unix, Linux, or Mac OS X).

In one embodiment, servers 12, 516 in the machine farm 518 may be stored in high-density rack systems, along with associated storage systems, and located in an enterprise data center. In this embodiment, consolidating the servers 516 in this way may improve system manageability, data security, the physical security of the system, and system performance by locating servers 12, 516 and high performance storage systems on localized high performance networks. Centralizing the servers 12, 516 and storage systems and coupling them with advanced system management tools allows more efficient use of server resources.

The servers 12, 516 of each machine farm 518 do not need to be physically proximate to another server 516 in the same machine farm 518. Thus, the group of servers 516 logically grouped as a machine farm 518 may be interconnected using a wide-area network (WAN) connection or a metropolitan-area network (MAN) connection. For example, a machine farm 518 may include servers 516 physically located in different continents or different regions of a continent, country, state, city, campus, or room. Data transmission speeds between servers 516 in the machine farm 518 can be increased if the servers 516 are connected using a local-area network (LAN) connection or some form of direct connection. Additionally, a heterogeneous machine farm 518 may include one or more servers 516 operating according to a type of operating system, while one or more other servers 516 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 518 may be de-centralized. For example, one or more servers 516 may comprise components, subsystems and modules to support one or more management services for the machine farm 518. In one of these embodiments, one or more servers 12, 516 provide functionality for management of dynamic data, including techniques for handling failover, data replication, and increasing the robustness of the machine farm 518. Each server 12, 516 may communicate with a persistent store and, in some embodiments, with a dynamic store.

Server 12, 516 may be a file server, application server, web server, proxy server, appliance, network appliance, gateway, gateway server, virtualization server, deployment server, SSL VPN server, or firewall, or any other suitable computing device, such as computing device 600. In one embodiment, the server 12, 516 may be referred to as a remote machine or a node. In another embodiment, a plurality of nodes may be in the path between any two communicating servers. The program or content creation system 10, FIG. 1, of the present invention can be stored on one or more of the servers 16, and the hardware associated with the server, such as the processor or CPU 30 and 36 and memory 33, 38, and 64 can be employed.

Figure 18:
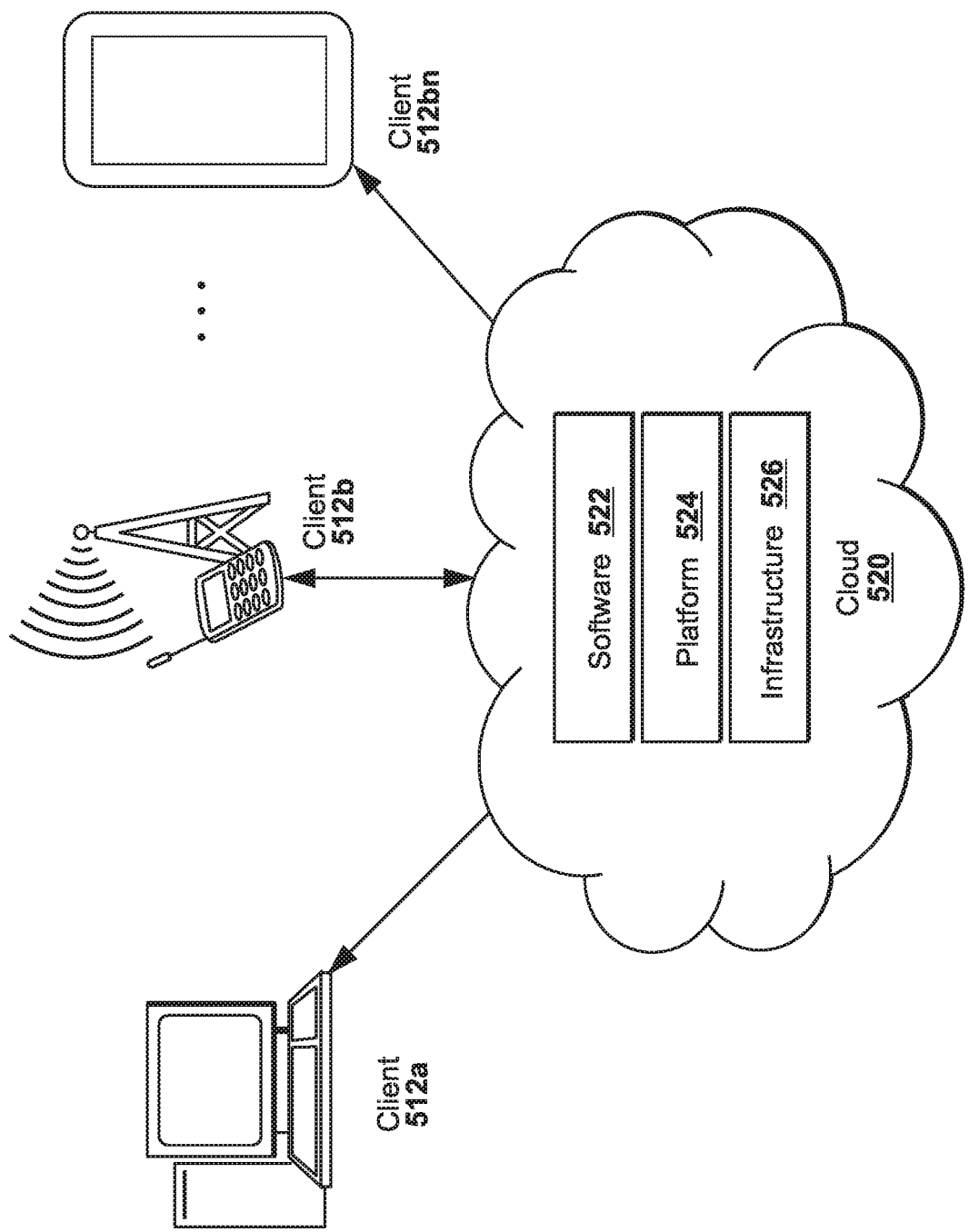
FIG. 18 is a schematic block diagram depicting a cloud computing environment that includes client devices in communication with a cloud service provider.

Referring to FIG. 18, a cloud computing environment is depicted for delivering for example software as a service (SaaS) is also contemplated by the present invention. A cloud computing environment may provide clients 16a-16n, 512 with one or more resources provided by a network environment. The cloud computing environment may include one or more clients 16a-16n, 512a-512n, in communication with the cloud 520 over one or more networks, an illustrative example of which is network 14, 514. Clients 16a-16n, 512 may include in addition to normal or conventional clients, either thick clients, thin clients, and zero clients. A thick client may provide at least some functionality even when disconnected from the cloud 520 or servers 516. A thin client or a zero client may depend on the connection to the cloud 520 or server 516 to provide functionality. A zero client may depend on the cloud 520 or other networks 514 or servers 516 to retrieve operating system data for the client device. The cloud 520 may include back end platforms, e.g., servers 516, storage, server farms or data centers.

The cloud 520 may be public, private, or a hybrid of both. Public clouds may include public servers 516 that are maintained by third parties to the clients 16a-16n, 512 or the owners of the clients. The servers 516 may be located off-site in remote geographical locations as disclosed above or otherwise. Public clouds may be connected to the servers 516 over a public network. Private clouds may include private servers 516 that are physically maintained by clients 512 or owners of clients. Private clouds may be connected to the servers 516 over a private network 514. Hybrid clouds 520 may include both the private and public networks 514 and servers 516. The program or content creation system 10 of the present invention can also be implemented in the cloud 520, and hence would be stored as software 522, and utilize the platform 524 and infrastructure 526 of the cloud 520, as well as one or more components of the computing device 600.

The cloud 520 may also include a cloud based delivery, e.g. Software as a Service (SaaS) 22, Platform as a Service (PaaS) 24, and Infrastructure as a Service (IaaS) 26. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 16a-16n, 512 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 16a-16n, 512 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 16a-16n, 512 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 16a-16n, 512 may also access SaaS resources through smartphone or tablet applications, including, e.g., Salesforce Sales Cloud, or Google Drive app. Clients 512 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 19:
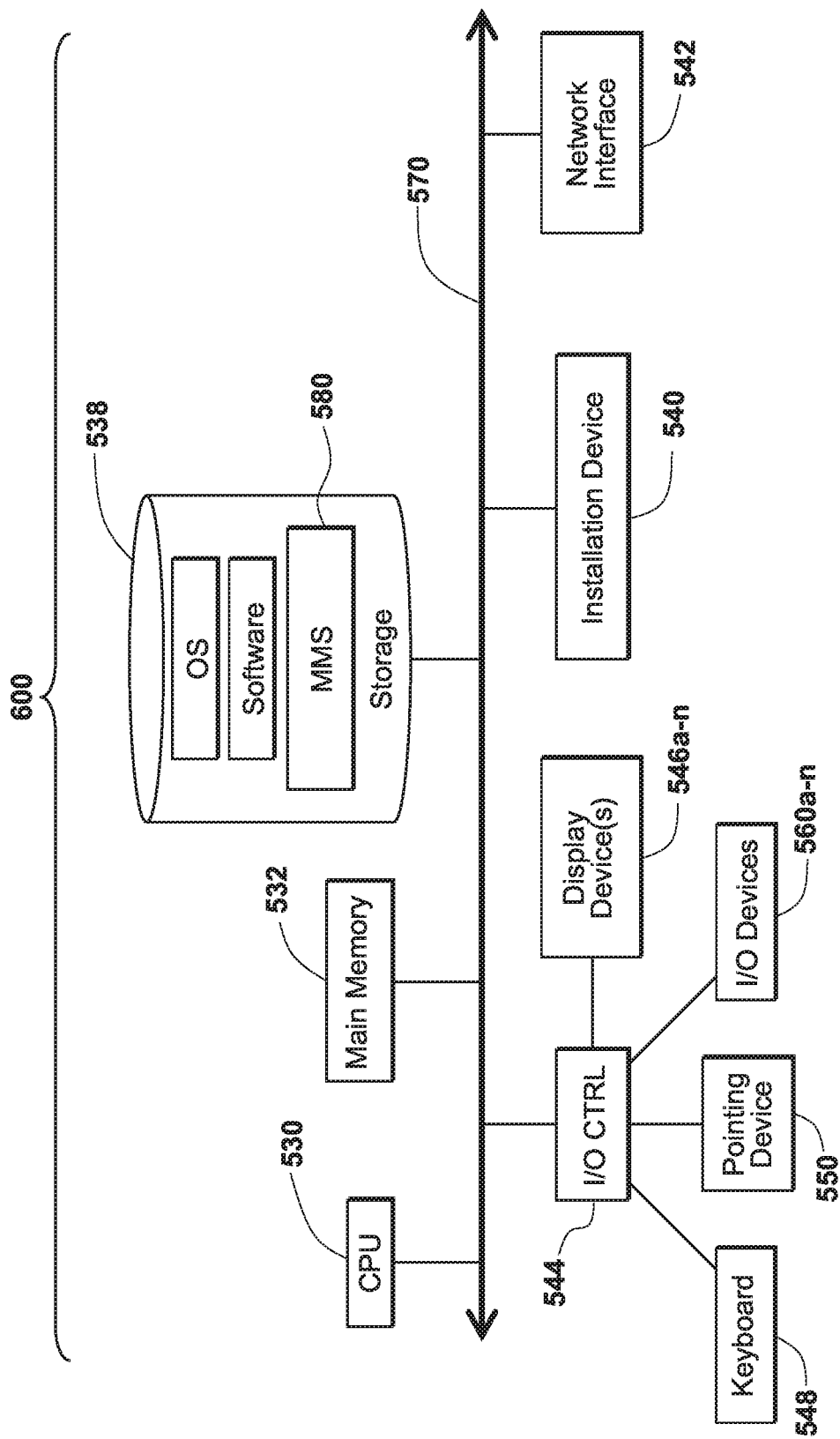
FIGS. 19 and 20 are schematic block diagrams depicting embodiments of computing devices useful for the methods and systems described herein.
Figure 20:
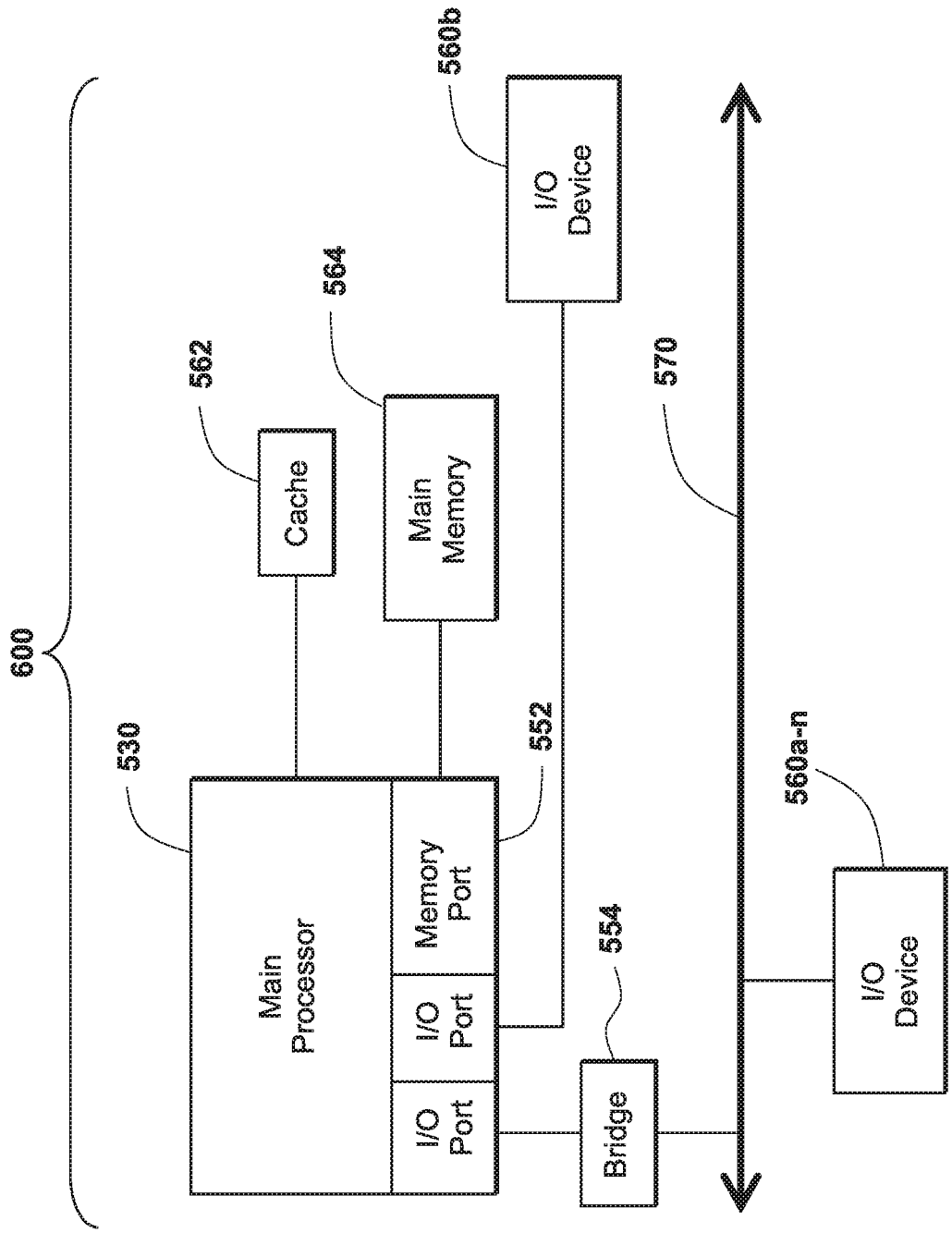

The client 16a-16n, 512 and server 12, 516 may be deployed as and/or executed on any type and form of computing device, such as for example a computer, network device or appliance capable of communicating on any type and form of network and performing the operations described herein. FIGS. 19 and 20 depict block diagrams of an electronic or computing device 600 useful for practicing an embodiment of the client 16a-16n, 512 and/or a server 12, 516. As shown in FIGS. 19 and 20, each electronic or computing device 600 includes a central processing unit 30, and a main memory unit 34. As shown in FIG. 19, a computing device 600 may include a storage device 538, an installation device 540, a network interface 542, an I/O controller 544, display devices 546a-546n, a keyboard 548 and a pointing device 550, e.g. a mouse. The storage device 538 may include, without limitation, an operating system, and/or software the program or content creation system 10. As shown in FIG. 20, each computing device 600 may also include additional optional elements, e.g. a memory port 552, a bridge 554, one or more input/output devices 560a-560n (generally referred to using reference numeral 560), and a cache memory 562 in communication with the central processing unit 530.

The central processing unit 530 is any logic circuitry that responds to and processes instructions fetched from the main memory unit 564. In many embodiments, the central processing unit 530 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 600 may be based on any of these processors, or any other processor capable of operating as described herein. The central processing unit 530 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 564 may include one or more memory chips capable of storing data and allowing any storage location to be directly accessed by the processor 530. The main memory unit 564 may be volatile and faster than memory of the storage unit 538. Main memory units 564 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 564 or the storage 538 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 564 may be based on any of the above described memory chips, or any other available memory chips capable of operating as described herein. In the embodiment shown in FIG. 19, the processor 530 communicates with main memory 532 via a system bus 570 (described in more detail below). FIG. 20 depicts an embodiment of a computing device 600 in which the processor communicates directly with main memory 564 via a memory port 552. For example, in FIG. 20 the main memory 564 may be DRDRAM.

FIG. 20 depicts an embodiment in which the main processor 530 communicates directly with cache memory 562 via a secondary bus, sometimes referred to as a backside bus. In other embodiments, the main processor 530 communicates with cache memory 562 using the system bus 570. Cache memory 562 typically has a faster response time than main memory 564 and is typically provided by SRAM, B SRAM, or EDRAM. In the embodiment shown in FIG. 20, the processor 530 communicates with various I/O devices 560 via a local system bus 570. Various buses may be used to connect the central processing unit 530 to any of the I/O devices 560, including a PCI bus, a PCI-X bus, or a PCI-Express bus, or a NuBus. For embodiments in which the I/O device is a video display 546, the processor 530 may use an Advanced Graphics Port (AGP) to communicate with the display 546 or the I/O controller 544 for the display 546. FIG. 20 depicts an embodiment of a computer 600 in which the main processor 530 communicates directly with I/O device 560b or other processors 530 via HYPERTRANSPORT, RAPIDIO, or INFINIBAND communications technology. FIG. 20 also depicts an embodiment in which local busses and direct communication are mixed: the processor 530 communicates with I/O device 560a using a local interconnect bus while communicating with I/O device 560b directly.

A wide variety of I/O devices 560a-560n may be present in the electronic or computing device 600. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 560a-560n may include a combination of multiple input or output devices, including, e.g., Microsoft KINECT, Nintendo Wiimote for the WII, Nintendo WII U GAMEPAD, or Apple IPHONE. Some devices 560a-560n allow gesture recognition inputs through combining some of the inputs and outputs. Some devices 560a-560n provides for facial recognition which may be utilized as an input for different purposes including authentication and other commands. Some devices 560a-560n provides for voice recognition and inputs, including, e.g., Microsoft KINECT, SIRI for IPHONE by Apple, Google Now or Google Voice Search.

Additional devices 560a-560n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXEL SENSE or Multi-Touch Collaboration Wall, may have larger surfaces, such as on a table-top or on a wall, and may also interact with other electronic devices. Some I/O devices 560a-560n, display devices 546a-546n or group of devices may be augment reality devices. The I/O devices may be controlled by an I/O controller 44 as shown in FIG. 19. The I/O controller may control one or more I/O devices, such as, e.g., a keyboard 548 and a pointing device 550, e.g., a mouse or optical pen. Furthermore, an I/O device may also provide storage and/or an installation medium 540 for the computing device 600. In still other embodiments, the computing device 600 may provide USB connections (not shown) to receive handheld USB storage devices. In further embodiments, an I/O device 560 may be a bridge between the system bus 570 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 546a-546n may be connected to I/O controller 544. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 546a-546n may also be a head-mounted display (HMD). In some embodiments, display devices 546a-546n or the corresponding I/O controllers 544 may be controlled through or have hardware support for OPENGL or DIRECTX API or other graphics libraries.

In some embodiments, the computing device 600 may include or connect to multiple display devices 546a-546n, which each may be of the same or different type and/or form. As such, any of the I/O devices 560a-560n and/or the I/O controller 544 may include any type and/or form of suitable hardware, software, or combination of hardware and software to support, enable or provide for the connection and use of multiple display devices 546a-546n by the computing device 600. For example, the computing device 600 may include any type and/or form of video adapter, video card, driver, and/or library to interface, communicate, connect or otherwise use the display devices 546a-546n. In one embodiment, a video adapter may include multiple connectors to interface to multiple display devices 546a-546n. In other embodiments, the computing device 600 may include multiple video adapters, with each video adapter connected to one or more of the display devices 546a-546n. In some embodiments, any portion of the operating system of the computing device 600 may be configured for using multiple displays 546a-546n. In other embodiments, one or more of the display devices 546a-546n may be provided by one or more other computing devices 600a or 600b connected to the computing device 600, via the network 514. In some embodiments software may be designed and constructed to use another computer's display device as a second display device 546a for the computing device 600. For example, in one embodiment, an Apple iPad may connect to a computing device 600 and use the display of the device 600 as an additional display screen that may be used as an extended desktop. One ordinarily skilled in the art will recognize and appreciate the various ways and embodiments that a computing device 600 may be configured to have multiple display devices 546a-546n.

Referring again to FIG. 19, the electronic or computing device 600 may comprise or be connected to a storage device 538 (e.g. one or more hard disk drives or redundant arrays of independent disks) for storing an operating system or other related software, and for storing application software programs such as any program related to the software 580 for the program creation system 10 of the present invention. Examples of storage devices 538 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. The storage device 538 may be non-volatile, mutable, or read-only. The storage device 538 may be internal and connect to the computing device 600 via a bus 570. Further, the storage device 538 may be external and connect to the computing device 600 via an I/O device 560 that provides an external bus. Some storage devices 538 may connect to the computing device 600 via the network interface 542 over a network 514, including, e.g., the Remote Disk for MACBOOK AIR by Apple. Some client devices 16a-16n, 512 may not require a non-volatile storage device 538 and may be thin clients or zero clients 16a-16n, 512. The storage device 538 may also be used as an installation device 540, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

The computing device 600 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 512. An application distribution platform may include a repository of applications on a server 516 or a cloud 520, which the clients 512a-512n may access over a network 514. An application distribution platform may include application developed and provided by various developers. A user of a client device 512 may select, purchase and/or download an application via the application distribution platform.

Furthermore, the computing device 600 may include a network interface 542 to interface to the network 514 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 600 communicates with other computing devices 600' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 542 may comprise a built-in network adapter, network interface card, PCMCIA network card, EXPRESSCARD network card, card bus network adapter, wireless network adapter, USB network adapter, modem or any other device suitable for interfacing the computing device 600 to any type of network capable of communication and performing the operations described herein.

The computing device 600 of the sort depicted in FIGS. 18 and 19 may operate under the control of an operating system, which controls scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOK S.

The computer system 600 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 600 has sufficient processor power and memory capacity to perform the operations described herein. In some embodiments, the computing device 600 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 600 is a tablet e.g. the IPAD line of devices by Apple; GALAXY TAB family of devices by Samsung; or KINDLE FIRE, by Amazon.com, Inc. of Seattle, Wash. In other embodiments, the computing device 600 is an eBook reader, e.g. the KINDLE family of devices by Amazon.com, or NOOK family of devices by Barnes & Noble, Inc. of New York City, N.Y.

In some embodiments, the computing device 600 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the computing device 600 is a laptop or desktop computer equipped with a web browser and a microphone and speaker system, e.g. a telephony headset. In these embodiments, the computing devices 600 are web-enabled and can receive and initiate phone calls. In some embodiments, a laptop or a desktop computer is also equipped with a webcam or other video capture device that enables video chat and video call. In some embodiments, the computing device 600 is a wearable mobile computing device including but not limited to Google Glass and Samsung Gear.

In some embodiments, the status of one or more machines 512, 516 in the network 14, 514 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the system disclosed herein.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

The invention claimed is:

1. A content creation system, comprising:
one or more client devices;
one or more servers including:
a database for storing show information including item information related to a plurality of items to be displayed and sold during a show, identification information associated with the plurality of items, a quantity of the plurality of items in stock in a warehouse, a plurality of audio segments, and a plurality of video segments, and
a program creation unit including a content generation unit having a processor for processing the show information received from the database and for creating the show for subsequent broadcast from the show information, the show having a plurality of plays, wherein the plurality of plays are formed by a user from a plurality of user interfaces, wherein one or more of the plurality of interfaces includes a plurality of selectable options having one or more types of the show information associated therewith, such that when one or more of the plurality of selectable options are selected by a user, the selected options form each of the plurality of plays forming the show; and
a network coupled to the one or more client devices and the one or more servers for allowing the one or more client devices to communicate with the one or more servers;
wherein one of the audio segments and the video segments are related to one or more of the plurality of items, and wherein the plurality of plays of the show form a predetermined part of the show;
wherein the processor of the content generation unit is programmed to generate a first interface of the plurality of interfaces having a window element with a plurality of tab elements, wherein the plurality of tab elements includes at least:
(i) a Shows tab element for displaying a list of shows associated with a selected user in the window element, wherein when the Shows tab element is actuated by a user, the content generation unit generates a second interface having the window element, wherein the window element displays in a tabular format the show information including at least two or more of a description of the shows, a host associated with each of the shows, a start time and an end time of the show, a program status of the show, and one or more action icons associated with the show,
(ii) an Item Inventory tab element for displaying inventory data of the plurality of items that are available to be sold during the show in the window element, wherein when the Inventory tab element of the plurality of tab elements is actuated by the user, the window element generated by the content generation unit includes a third interface having an inventory pane element that includes a plurality of item specific fields that enable the user to search for and select one or more of the plurality of items in inventory according to one or more predetermined attributes, wherein the one or more predetermined attributes includes an item type, a brand name of the item, a color of the item, a material type of the item, and a price of the item, (iii) a Show Design tab element for displaying a fourth interface of the plurality of interfaces that allows the user to create and organize the show, wherein in response to the actuation of the Show Design tab element by the user, the content generation unit generates and displays the show information including a plurality of financial metrics associated with the plurality of items in the show selected from the third interface, such that the content generation unit determines a gross revenue and a gross margin of one or more of the plurality of plays and of the show and a gross margin of the show based on the plurality of items selected by the user, wherein the program creation unit creates the show from the show information selected in two or more of the first interface, the second interface, the third interface, and the fourth interface.

2. The content generation system of claim 1, wherein the program the plurality of tab elements further comprises:

(iv) a Show Schedule tab element for displaying when actuated in a fifth interface the show information including a schedule of the show created by the program creation unit and associated broadcast dates and times thereof, (v) an Analysis tab element for displaying data associated with the analysis of the constructed show, and (vi) a Live Show tab element for displaying in a user interface show information associated with a live broadcast of the show, wherein the program creation unit creates the show from the show information selected in two or more of the first interface, the second interface, the third interface, the fourth interface, and the fifth interface.

3. The content generation system of claim 2, wherein when the My Shows tab element of the plurality of tab elements is actuated, the window element further comprises a centrally located pane element that extends from the left side of the window element to the right side of the window element and is disposed adjacent to the plurality of tab elements, and wherein the centrally located pane element includes in the tabular format the description of the shows, the host associated with each of the shows, the start time and an end time of the show, the program status of the show, and the one or more action icons associated with the show.

4. The content generation system of claim 3, wherein the action icons displayed in the window element include a plurality of soft button elements, wherein one or more of the soft button elements are representative of one or more of the tab elements.

5. The content generation system of claim 3, wherein when the Shows tab element is actuated, the centrally located pane element includes a search field pane element that includes a plurality of search field elements.

6. The content generation system of claim 5, wherein the plurality of search field elements enable the user to search for shows using a plurality of search metrics including a user name, a description of the show, a type of show, and a status of the show.

7. The content generation system of claim 2, wherein when the Design tab element of the plurality of tab elements is actuated by the user, the window element includes a top pane element disposed below and adjacent to a portion of the window element that displays the tab elements, a left pane element, and a right pane element, wherein the left pane element and the right pane element are below the top pane element and extend from left to right across the window element.

8. The content generation system of claim 7, wherein the top pane element displays the plurality of financial metrics associated with the plurality of items in the show.

9. The content generation system of claim 8, wherein the left pane element displays data associated with an outline of the show, wherein the outline has one or more plays associated therewith, and wherein the data includes a number of plays forming the show and the type of plays that form the show.

10. The content generation system of claim 9, wherein each play of the show further comprises one or more of the plurality of items selected from the Inventory tab element.

11. The content generation system of claim 9, wherein the right pane element displays one or more contingency plays of the show.

12. The content generation system of claim 11, wherein the user moves one or more of the contingency plays in the right pane element to the left pane element.

13. The content generation system of claim 11, wherein the right pane element further comprises one or more of video data, audio data, and data associated with one or more of the plurality of items.

14. The content generation system of claim 7, wherein when the window element is actuated, the content generation unit generates the window element having a right pane element and first and second left pane elements, wherein the first and second left panes are stacked, and wherein the right pane element and the first left pane element are disposed below and immediately adjacent to the portion of the window element that displays the tab elements.

15. The content generation system of claim 14, wherein the right pane element comprises a Show Components pane element for displaying one or more of the plurality of items that are selected from inventory by actuating the Inventory tab element.

16. The content generation system of claim 15, wherein the first left pane element includes a Play Components pane element for displaying one or more items in one or more of the plays of the show, and wherein the second left pane element includes a Contingency Component pane element for displaying one or more contingency items for replacing one or more of the items in the show or the play.

17. The content generation system of claim 16, wherein the items displayed in the Show Component pane element are movable by the user to the Play Components pane element and to the Contingent Components pane element.

18. The content generation system of claim 16, wherein one or more of the items displayed in the Play Components pane element includes a Key Item designation.

19. The content generation system of claim 16, wherein the Show Components pane element includes a filter field for allowing the user to search selected items in the inventory according to one or more selected attributes.

20. The content generation system of claim 16, wherein the content generation unit generates in a bottom portion of the window element a Play Comments button element for displaying when actuated a Play Comments field.

21. The content generation system of claim 20, wherein the Play Comment field allows a user to input selected comments on the play that is being created through a text input field.

22. The content generation system of claim 16, wherein the right pane element further comprises a plurality of tab elements.

23. The content generation system of claim 22, wherein the plurality of tab elements comprises a Products tab element for displaying one or more preselected items and a Programming Elements tab element for allowing the user to select one or more programming components of the play of the show.

24. The content generation system of claim 23, wherein when actuated the Programming Elements tab element invokes a Category field and a Name field to be displayed in the right pane element, wherein the Category field has a drop down menu that includes a number of selectable menu items that form a library that can be selected by the user.

25. The content generation system of claim 2, wherein when the Analysis tab element is actuated, the content generation unit generates an interface displaying a plurality of metrics associated with the plays and the items forming part of the play.

26. The content generation system of claim 25, wherein the metrics include the Product Types in each play, a number of items of each type, and the plays created for the program.

27. The content generation system of claim 2, wherein the content creation unit generates a print icon element that is actuatable by a user, wherein when the print icon element is actuated, the content generation unit generates and displays a run sheet of the play of the show, wherein the run sheet is a collection of information in a sheet format that allows the user to plan and execute the program.

28. The content generation system of claim 2, wherein when the Inventory tab element of the plurality of tab elements is actuated by a user the content creation unit generates an interface having the window element, wherein the window element further comprises an inventory pane element that extends from the left side of the window element to the right side of the window element and is disposed immediately adjacent to a portion of the window element that displays the tab elements, wherein the pane element displays information associated with the plurality of items in inventory, wherein the inventory pane element includes a plurality of item specific fields that enable the user to search for and select one or more of the plurality of items in the inventory according to one or more predetermined attributes, and wherein the inventory pane element further includes along a right hand side portion thereof a plurality of stacked field elements associated with a formation of the show.

29. The content generation system of claim 28, wherein when the Design tab element of the plurality of tab elements is actuated by a user the content creation unit generates an interface having the window element, wherein the window element includes a top pane element disposed below and adjacent to the portion of the window element that displays the tab elements, a left pane element, and a right pane element, wherein the left pane element and the right pane element are below the top pane element and extend from left to right across the window element, and
wherein the top pane element displays a plurality of financial metrics associated with the plurality of items in the show,
wherein the left pane element displays data associated with an outline of the show, wherein the outline has one or more plays associated therewith, and wherein the data includes a number of plays forming the show and a type of plays that form the show, and wherein the right pane element displays one or more contingency plays of the show.

30. The content generation system of claim 29, wherein when the window element is actuated, the content generation unit generates the window element having a right pane element and first and second left pane elements, wherein the first and second left panes are stacked, and wherein the right pane element and the first left pane element are disposed below and immediately adjacent to the portion of the window element that displays the tab elements.

31. The content generation system of claim 30, wherein the right pane element comprises a Show Components pane element for displaying one or more of the plurality of items that are selected from inventory by actuating the Inventory tab element, wherein the first left pane element includes a Play Components pane element for displaying one or more items in one or more of the plays of the show, and wherein the second left pane element includes a Contingency Component pane element for displaying one or more contingency items for replacing one or more of the items in the show or the play.

32. The content generation system of claim 31, wherein when the Analysis tab element is actuated, the content generation unit generates the window element having a plurality of metrics associated with the play and the items forming part of the play, wherein the metrics include the Product Types in each play, a number of items of each type, and the plays created for the show.

33. The content generation system of claim 2, wherein the inventory pane element extends from the left side of the window element to the right side of the window element and is disposed immediately adjacent to a portion of the window element that displays the tab elements, wherein the pane element displays information associated with the plurality of items in inventory.

34. The content generation system of claim 33, wherein the inventory pane element further comprises along a right side portion thereof a plurality of stacked field elements associated with a formation of the show.

35. The content generation system of claim 34, wherein the plurality of stacked field elements includes a first field element associated with items selected for the show, a stacked second field element indicating a status of the show and items associated therewith, and a third stacked field element displaying a planning history of the show.

36. The content generation system of claim 1, wherein each of the plays of the show have a name associated therewith and are arranged in a selected sequence to form the show.

37. A computer implemented method, the method comprising:
providing one or more client devices;
providing one or more servers including a database for storing show information including item information related to a plurality of items to be displayed and sold during a show, identification information associated with the plurality of items, a quantity of the plurality of items in stock in a warehouse, a plurality of audio segments, and a plurality of video segments;
processing the show information received from the database with a program creation unit for creating the show for subsequent broadcast from the show information, the show having a plurality of plays, wherein the plurality of plays are formed by a user from a plurality of user interfaces, wherein one or more of the plurality of interfaces includes a plurality of selectable options having one or more types of the show information associated therewith, such that when one or more of the plurality of selectable options are selected by a user, the selected options form each of the plurality of plays;

generating a first interface of the plurality of interfaces having a window element with a plurality of tab elements, wherein the plurality of tab elements includes at least:
- (i) a Shows tab element for displaying a list of shows associated with a selected user in the window element, wherein when the Shows tab element is actuated by a user, generating a second interface having the window element, wherein the window element displays in a tabular format the show information including at least two or more of a description of the shows, a host associated with each of the shows, a start time and an end time of the show, a program status of the show, and one or more action icons associated with the show,
- (ii) an Item Inventory tab element for displaying inventory data of the plurality of items that are available to be sold during the show in the window element, wherein when the Inventory tab element of the plurality of tab elements is actuated by the user, generating a third interface having an inventory pane element that includes a plurality of item specific fields that enable the user to search for and select one or more of the plurality of items in inventory according to one or more predetermined attributes, wherein the one or more predetermined attributes includes an item type, a brand name of the item, a color of the item, a material type of the item, and a price of the item,
- (iii) a Show Design tab element for displaying a fourth interface of the plurality of interfaces that allows the user to create and organize the show, wherein in response to the actuation of the Show Design tab element by the user, generating and displaying the show information including a plurality of financial metrics associated with the plurality of items in the show selected from the third interface, and determining a gross revenue and a gross margin of one or more of the plurality of plays and of the show and a gross margin of the show based on the plurality of items selected by the user, creating the show from the show information selected in two or more of the first interface, the second interface, the third interface, and the fourth interface; and providing a network coupled to the one or more client devices and the one or more servers for allowing the one or more client devices to communicate with the one or more servers.

38. The method of claim 37, wherein when the Inventory tab element of the plurality of tab elements is actuated, generating an interface having the window element, wherein the window element further comprises an inventory pane element that extends from the left side of the window element to the right side of the window element and is disposed immediately adjacent to a portion of the window element that displays the tab elements, wherein the pane element displays information associated with the plurality of items in inventory, and wherein the inventory pane element further includes along a right hand side portion thereof a plurality of stacked field elements associated with a formation of the show.

39. The method of claim 38, wherein fourth interface includes the window element, wherein the window element includes a top pane element disposed below and adjacent to the portion of the window element that displays the tab elements, a left pane element, and a right pane element, wherein the left pane element and the right pane element are below the top pane element and extend from left to right across the window element, and
- wherein the top pane element displays the show information including the plurality of financial metrics associated with the plurality of items in the show,
- wherein the left pane element displays data associated with an outline of the show, wherein the outline has one or more plays associated therewith, and wherein the data includes a number of plays forming the show and a type of plays that form the show, and
- wherein the right pane element displays one or more contingency plays of the show.

40. The method of claim 39, wherein when the window element is actuated, generating the window element having a right pane element and first and second left pane elements, wherein the first and second left panes are stacked, and wherein the right pane element and the first left pane element are disposed below and immediately adjacent to the portion of the window element that displays the tab elements.

41. The method of claim 40, wherein the right pane element comprises a Show Components pane element for displaying one or more of the plurality of items that are selected from inventory by actuating the Inventory tab element, wherein the first left pane element includes a Play Components pane element for displaying one or more items in one or more of the plays of the show, and wherein the second left pane element includes a Contingency Component pane element for displaying one or more contingency items for replacing one or more of the items in the show or the play.

42. The method of claim 41, wherein when the Analysis tab element is actuated, generating the window element having a plurality of metrics associated with the play and the items forming part of the play, wherein the metrics include the Product Types in each play, a number of items of each type, and the plays created for the show.

\* \* \* \* \*